US006892986B2

(12) United States Patent
Bingaman et al.

(10) Patent No.: US 6,892,986 B2
(45) Date of Patent: May 17, 2005

(54) SATELLITE CONSTELLATIONS USING NODALLY-ADJUSTED REPEATING GROUND TRACK ORBITS

(75) Inventors: Gary L. Bingaman, Downey, CA (US); Seth D. Potter, Redondo Beach, CA (US)

(73) Assignee: The Boeing Company, Chicago, IL (US)

( * ) Notice: Subject to any disclaimer, the term of this patent is extended or adjusted under 35 U.S.C. 154(b) by 189 days.

(21) Appl. No.: 10/420,279

(22) Filed: Apr. 22, 2003

(65) Prior Publication Data

US 2004/0065781 A1 Apr. 8, 2004

Related U.S. Application Data

(60) Provisional application No. 60/376,217, filed on Apr. 29, 2002.

(51) Int. Cl.[7] .................................................. B64G 1/10
(52) U.S. Cl. .................................................. 244/158 R
(58) Field of Search ...................... 244/158 R; 455/12.1, 455/427; 701/226; 342/356

(56) References Cited

U.S. PATENT DOCUMENTS

| 4,809,935 | A | * | 3/1989 | Draim |
| 5,267,167 | A | * | 11/1993 | Glickman |
| 5,326,054 | A | * | 7/1994 | Turner |
| 5,433,726 | A | * | 7/1995 | Horstein et al. |
| 5,979,832 | A | * | 11/1999 | Draim |
| 5,999,127 | A | * | 12/1999 | Dezelan |
| 6,017,000 | A | * | 1/2000 | Scott |
| 6,102,335 | A | * | 8/2000 | Castiel et al. |
| 6,122,596 | A | * | 9/2000 | Castiel |
| 6,457,678 | B1 | * | 10/2002 | Draim |
| 6,464,174 | B1 | * | 10/2002 | Turner |

OTHER PUBLICATIONS

Wertz, James R., Microcosm, Inc., *Space Mission Analysis and Design,* Space Technology Library, ed. James R. Wertz and Wiley J. Larson, Khrwer Academic Publishers, 1991, Chapter 5, Space Mission Geometry, pp. 79–112; Chapter 6, Introduction to Astrodynamics, pp. 113–140; Chapter 7, Orbit and Constellation Design, pp. 141–182.

* cited by examiner

*Primary Examiner*—Tien Dinh
(74) *Attorney, Agent, or Firm*—Gates & Cooper LLP

(57) ABSTRACT

A satellite system and method is disclosed. A plurality of satellites includes one or more satellites in circular orbits and at least one satellite of the plurality of satellites in an elliptcal orbit. Each of the plurality of satellites has substantially the same nodal regression rate. An exemplary constellation uses an inclination of substantially 63.43°. The elliptical orbit can be implemented by a refuelable satellite used to make low perigee passes over a location of interest.

36 Claims, 24 Drawing Sheets

SATELLITE CONSTELLATIONS USING NODALLY-ADJUSTED REPEATING GROUND TRACK ORBITS

CROSS-REFERENCE TO RELATED APPLICATIONS

This application claims the benefit of the following co-pending and commonly-assigned U.S. provisional patent application, which is incorporated by reference herein:

U.S. patent application Ser. No. 60/376,217, by Gary L. Bingaman et al., filed Apr. 29, 2002, and entitled "CONCEPT OF OPERATION FOR SATELLITE CONSTELLATIONS USING NODALLY-ADJUSTED REPEATED GROUND TRACK ORBITS".

GOVERNMENT RIGHTS STATEMENT

This invention was made with Government support under MDA972-00-0-0015 awarded by the Government. The Government has certain rights in the invention.

BACKGROUND OF THE INVENTION

1. Field of the Invention

The present invention relates to methods and systems to provide surveillance, observation, and/or communication using Earth orbiting satellites. Particularly, the present invention relates to methods and systems to provide such services using on-orbit refueled satellites.

2. Description of the Related Art

A majority of satellite missions involve providing either surveillance, observation, and/or communication of (or for) Earth-based locations. Consequently, managing a satellite's relative position with the Earth is a critical factor in developing a satellite constellation configuration and orbital design. For most current satellites, the amount of thruster propellant carried by the satellite determines the operational life of the satellite. Fuel-depleted satellites are generally de-orbited or otherwise disposed. In the past, the operating assumption has been that it is less expensive to launch a new satellite than to repair or refuel an existing satellite. Thus, minimizing fuel consumption has always been an important part of satellite design and plays a key role in orbital design for the mission.

Naturally, the orbital parameters and configuration affect what can be performed by a given satellite or satellite constellation. In general, the use of high altitude orbits improves the area coverage capability and reduces the number of satellites required to achieve global coverage. Conversely, lower orbits provide better coverage resolution (e.g., observation or surveillance) for specific areas of interest.

There is a need in the art for methods and systems of satellite operations that can utilize one satellite constellation for both purposes with an optimum number of satellites for global coverage while still providing high resolution coverage to specific areas of interest with a short response time. There is further a need for such methods and systems to operate while minimizing fuel usage. As detailed hereafter, these and other needs are met by the present invention.

SUMMARY OF THE INVENTION

The present invention enhances the utility of on-orbit satellite refueling to constellations of global coverage surveillance satellites. With this invention it becomes feasible to lower the perigee altitude of one or more satellites in a global coverage constellation to provide daily close observations of a specific area of interest, then return it/them to its/their original orbit altitude and maintain the integrity of the constellation with minimal use of propellant.

A satellite whose perigee is lowered to provide a close observation of a specific region of interest can maintain the same nodal regression rate as the originating constellation by raising its apogee. This facilitates reinsertion into the original constellation with minimal use of propellant when peak observation demand conditions end. With the appropriate choice of apogee/perigee combination, an Earth fixed, daily repeating, ground track is possible. This provides daily repeatable low altitude revisits over specific areas of interest. Thus, one satellite constellation can combine the advantages of both high altitudes (more complete global coverage with fewer satellites) and lower altitudes (better close observation focused site resolution).

For example, a refuelable satellite constellation can be deployed at a high altitude for full global coverage during low demand steady-state conditions. During high demand surge conditions, one or more satellites can be redeployed into orbits having low perigee passes over regions of interest. By also raising the apogee, these satellites will maintain the same nodal regression as the rest of the constellation, and the perigee and apogee altitudes can be selected to provide for a daily repeating ground track over the region of interest.

The selection of orbits and constellation configurations for these applications may be driven, in part, by the opportunities provided by refuelable and serviceable satellites. Such serviceable satellites will also allow for spacecraft rescue from unusable orbits and provide for repairs to inoperable satellites for salvage or reuse via refueling or repair (i.e., replacement of sensor units, batteries, reaction wheels, etc.). In addition, satellites with excessive design weight growth can be launched with less propellant and fueled, as needed, on location. Fuel to efficiently de-orbit the satellite can also be added at end of life in order to reduce space debris.

Embodiments of the present invention allow one satellite constellation to perform the work of two. For surveillance satellites, one constellation can provide both global coverage and very high resolution at specific places and times. For communications satellites, one constellation can provide both steady state baseload and high demand peak service, and may be physically reconfigurable as market demands change.

In a typical embodiment of the invention, a satellite system comprises a satellite constellation including a plurality of satellites orbiting a planet to provide a coverage pattern of the planet. The plurality of satellites includes one or more satellites in high altitude circular orbits for steady state observations. For close observation demands, at least one satellite of the plurality of satellites can be shifted to a low perigee elliptical orbit. The elliptical orbit altitudes are selected so that each of the plurality of satellites has substantially the same nodal regression rate. An exemplary constellation uses an inclination of 63.43° to eliminate apsidal precession in the elliptical orbit. The transition to and from the elliptical orbit can be implemented by refuelable satellites. In further embodiments, groups of elliptically orbiting satellites can be deployed from one or more planes of the global coverage constellation. Each of the group could be from the same constellation plane with a common right ascension of ascending node or a row of satellites from different constellation planes each having a different right ascension of ascending node and different initial mean anomaly could be selected. These options would provide for multiple satellite viewing of a single area of interest at different times and/or from different directions. Additionally, the constellation is also designed such that the elliptical satellite altitudes can be adjusted to produce regular daily repeating ground tracks.

Embodiments of the invention can provide the advantage of allowing communications satellites to be redeployed into different orbits as markets change. In addition, the invention can be extended to different altitude constellations for repeating ground track orbits with repeat times of other than one day. Additional applications may also include planetary exploration; e.g., satellites in orbit around the Moon or Mars. In these applications, the orbital perturbations will be different, but the same concepts will apply.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1A:
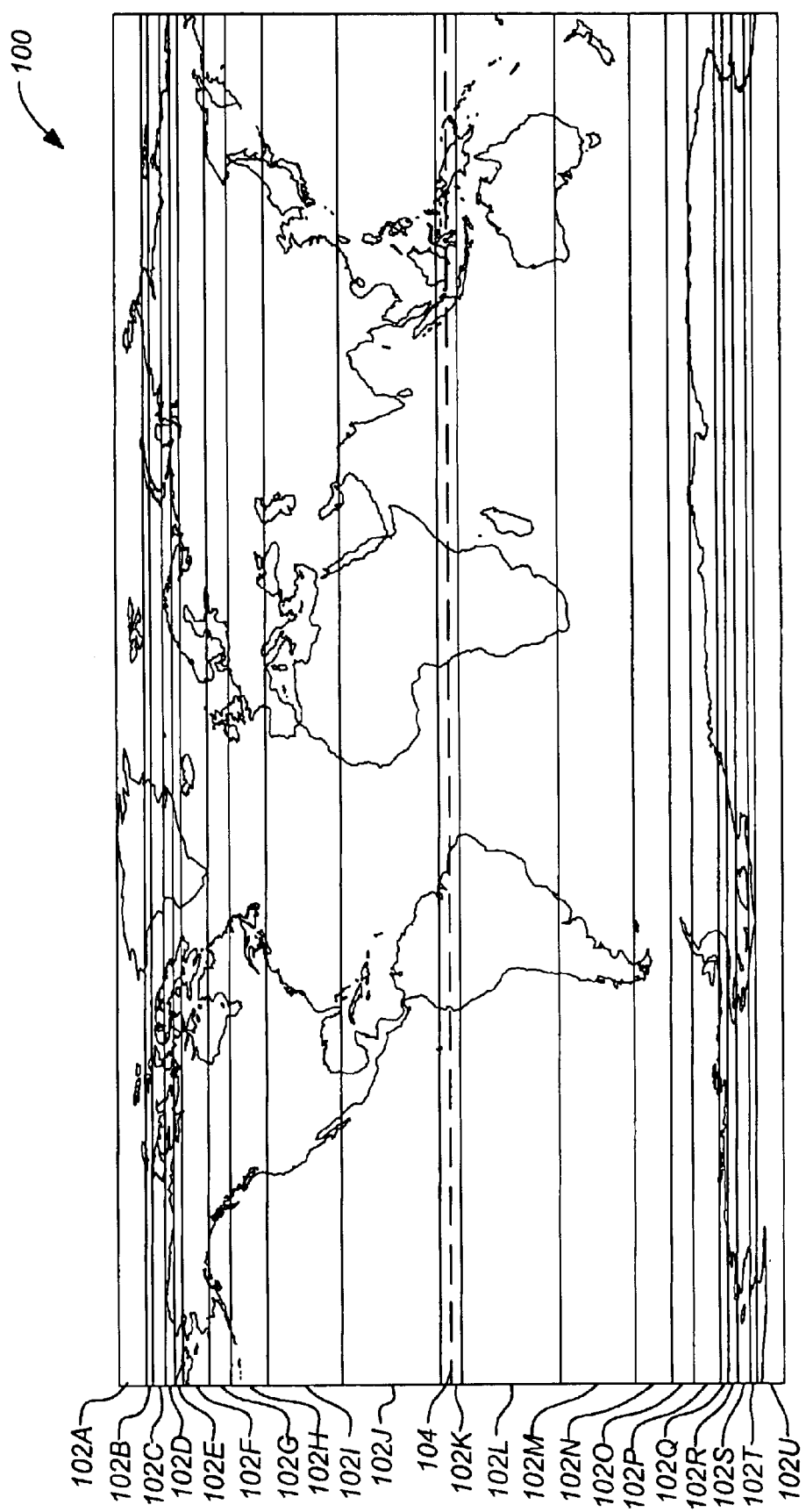
FIG. 1A illustrates coverage from a reference exemplary Earth observation constellation at nominal optimal altitude and inclination.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

1. Overview

Although fuel is still an important consideration, recent efforts have focused on missions where satellites are refueled rather than replaced. Working with satellites that are refueled provides more latitude in mission design. New possibilities for orbital design are enabled. The present invention is very well suited for implementation with refuelable satellites, however, they are not required. For example, adequate advances in propulsion technology and/or shorter spacecraft life requirements can also allow the present invention to be applied to satellites that are not refueled.

The maneuverability of satellites in an Earth-orbiting constellation has thus far been limited by the amount of onboard propellant launched with the satellites. This propellant limitation has primarily constrained the use of onboard propulsion systems to attitude control and orbit maintenance once the satellites have reached their operational orbit. However, a cost-effective on-orbit refueling capability may become available within the next ten to fifteen years and can enable new concepts of operation. For example, an Earth-surveillance satellite constellation should provide near-continuous coverage of much of the globe with a limited number of satellites (a requirement that drives the design altitude higher), while also providing sufficient resolution to permit identification of ground assets and activities (a requirement that drives the design altitude lower).

While steady-state requirements can be met with a few satellites in a high altitude orbit, surge requirements may demand higher resolution for selected regions of interest, driving the design altitude down and the number of satellites required for global coverage up, along with the total system cost. With an on-orbit refueling capability and proper constellation design and operation, however, a sparse high altitude constellation can both cover the globe in a high altitude orbit and provide for low altitude passes with higher resolution.

When surge conditions arise, any satellite can be placed in an elliptical orbit with a low perigee pass over the area of interest, using on-board propellant. This can be done with a low-energy, Hohmann transfer burn to lower the perigee for one orbit, then immediately raising and rephasing the satellite into the original orbit position. If maintained for more than one low perigee orbit, the differences in orbital period and nodal regression rates will impact the integrity of the constellation requiring the need for significant orbital adjustment when the low pass satellite is reinserted into the original constellation.

Alternatively, the satellite can be placed in a high-energy transfer orbit with a low perigee and high apogee, such that either the nodal regression rate, or the orbital period, remains substantially the same as the other satellites in the constellation. This will maintain the basic integrity of the original constellation and will permit easy reinsertion of the low pass satellite back into the original constellation. Repeated (e.g. daily) perigee passes over an area of interest are possible, provided that there is no apsidial rotation. The latter condition occurs if the orbital inclination of the elliptical satellite is 63.4 degrees. In order to permit easy reinsertion of the elliptical satellite into its original orbit, while keeping propellant use to a minimum, the entire constellation must be placed in the 63.4 degree inclination. While the orbital inclinations of proposed surveillance satellites are somewhat lower, the higher inclination provides improved coverage at high latitudes, at a cost of somewhat degraded coverage at low latitudes. This degradation can be mitigated somewhat by using a higher altitude baseline orbit.

The use of on-orbit refueling permits greater flexibility in satellite constellation design and certain operational constraints can either be relaxed or entirely eliminated. One constellation can be designed to provide the functionality of several constellations, thus increasing its cost effectiveness.

Once the effectiveness of on-orbit refueling of satellites is established, additional applications may arise. Communications satellites can be redeployed into different orbits as markets change; inoperable satellites can be salvaged for reuse; satellites stranded in unusable orbits can be repositioned; satellites with design weight growth can be launched without propellant and fueled on location; satellites can be efficiently de-orbited to reduce space debris.

Ordinary cost analysis of refuelable satellites may not tell entire story: refueling may not only save money, but may also permit greater flexibility in satellite constellation design. Some operational constraints facing the non-refuelable satellite model can be relaxed or eliminated with refuelable satellites. For example constellation designs can incorporate a more liberal use of recurring orbit adjustment. As described hereafter, embodiments of the present invention make use of this principle.

For example, embodiments of the invention makes it possible to augment a satellite system designed for baseload global communications with additional satellites that provide peak coverage to major population centers. Further, the invention can leverage technology for satellite-to-satellite crosslinks.

2. Exemplary Embodiments for Earth Observation

FIG. 1A illustrates coverage, as percent of time, from an exemplary reference Earth observation constellation. The constellation includes 24 satellites in 8 planes in a 770-km circular orbit, inclined 52°. The coverage pattern 100 is illustrated by separate bands 102A–102U, each corresponding to a static contour for a different percent of time coverage. The pattern 100 is symmetric about the equator 104. Thus, the equatorial band 102K receives approximately 90 percent of time coverage. Bands 102J and 102L nearby receive approximately 95 percent of time coverage, while bands 102I and 102M receive over 100 percent of time coverage (i.e. the areas are covered by more than one satellite). The coverage falls back slightly to approximately 95 percent for bands 102H and 102N and then returns to over 100 percent for bands 102G and 102O. Bands 102F and 102P receive approximately 95 percent of time coverage, but bands 102E and 102Q receive only approximately 90 percent. The coverage rapidly diminishes towards the poles with bands 102D and 102R receiving approximately 80 percent, bands 102C and 102S receiving approximately 50 percent, bands 102B and 102T receiving approximately 20 percent and bands 102A and 102U receiving only a few percent of time coverage.

The satellite altitude to produce the pattern 100 strikes a compromise between full Earth coverage with the fewest number of satellites and best resolution. For some uses, the resolution at 770 km may be insufficient for surge conditions. Surge conditions imply a period of high demand or usage rates. In addition, a lower altitude constellation may not be cost effective due to the higher number of satellites required for full coverage. However, in this case surge, or high demand, conditions tend to occur only over limited areas.

Figure 1B:
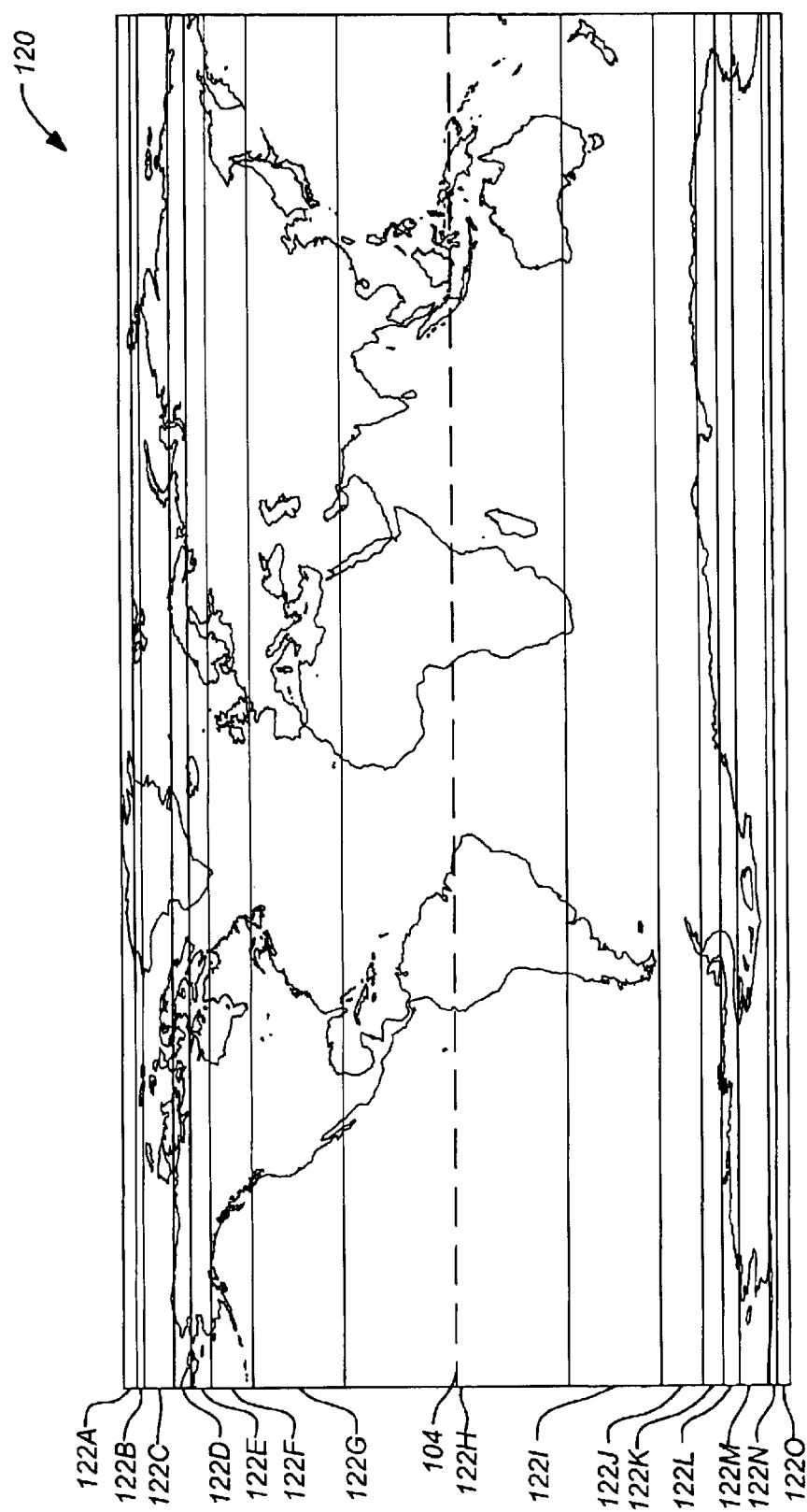
FIG. 1B illustrates coverage from a reference exemplary Earth observation constellation with fewer satellites at a raised altitude.

FIG. 1B illustrates coverage, as percent of time, from an exemplary reference Earth observation constellation at a raised altitude. The altitude was raised to decrease the number of satellites required for global coverage. In this case, the coverage pattern 120 is the result of 18 satellites in 6 planes in a 1100 km orbit also at a 52° inclination. When compared to the pattern 100 of FIG. 1A, there appears to be somewhat less variance in the time coverage near the equator, indicated by fewer bands as coverage seems to improve slightly at lower latitudes. The sensor resolution is degraded somewhat due to the raised altitude, but may be sufficient for steady-state conditions.

The coverage pattern 120 includes a relatively large coverage band 122H around the equator 104, yielding approximately 95 percent of time coverage. Adjacent the central band 122H are bands 122G and 122I which each receive over 100 percent of time coverage. The coverage falls again to approximately 95 percent for bands 122F and 122J. Thereafter the time coverage begin to decline rapidly at higher and lower latitude with bands 122E and 122K receiving approximately 90 percent, bands 122D and 122L receiving approximately 80 percent of time coverage, bands 122C and 122M receiving approximately 50 percent of time coverage, bands 122B and 122N receiving approximately 20 percent of time coverage and bands 122A and 122O receiving only a few percent of time coverage.

In developing embodiments of the present invention, one can first consider placing a single satellite (e.g. of the preceding constellation of FIG. 1B) into a lower circular orbit, or in an elliptical orbit having an 1100 km apogee and a lower perigee. However, in the case of an elliptical orbit with apogee at the same altitude as the original constellation, the change in the semi-major axis and eccentricity will result in a different nodal regression rate and orbital period from the other satellites in the constellation. In addition, a precession of the perigee will occur. Expensive plane changes and rephasing would be necessary when the surge, or high demand, conditions end and the low pass satellite needs to be reinserted into the original constellation.

To solve this problem, the apogee of the low pass satellite can be raised so that the original nodal regression rate is restored to match that of the other satellites in the constellation. However, because of apsidal precession the perigee point of the low pass satellite will not remain over the area of interest.

To resolve this issue and keep the argument of perigee constant, the inclination of the low pass satellite can be changed to approximately 63.43° (inclination for zero apsidal precession). However, to avoid a propellant expensive plane change for the low pass satellite, the entire satellite constellation must be placed at this inclination.

Figure 2A:
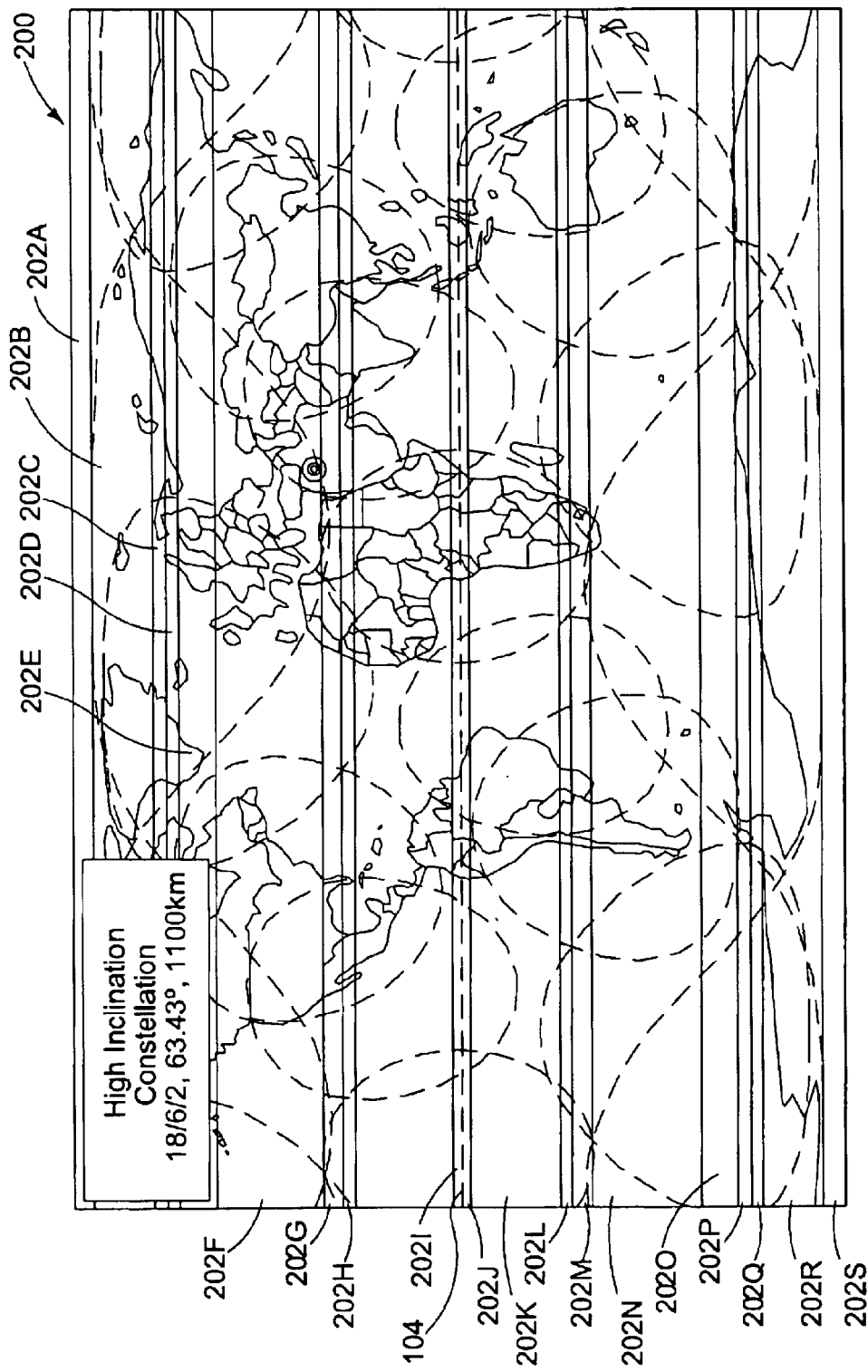
FIG. 2A illustrates coverage from a reference exemplary Earth observation constellation with fewer satellites at a raised altitude and a higher inclination.

FIG. 2A illustrates coverage from an exemplary reference Earth observation constellation using a higher inclination of 63.43°. This constellation comprises 18 satellites in 6 planes (as the constellation of FIG. 1B), however, the 1100 km orbits, and any low pass elliptical orbits, will now have 0 apsidal precession at 63.43° inclination. Compared with the coverage percentage time static contours of FIGS. 1A and 1B, this coverage pattern 200 exhibits generally higher coverage at all latitudes. However, as mentioned above, the lowest coverage (approximately 80 percent) appear near the equator 104 rather than the poles as with the patterns of FIGS. 1A and 1B. Consequently, although a higher inclination will improve coverage of the polar regions, coverage of lower latitudes (which usually have a higher priority) will degrade.

The coverage pattern 200 includes a very narrow band 202J around the equator 104 that receives approximately 90 percent of time coverage. Bounding this central band 202J are bands 202I and 202K which receive approximately 80 percent of time coverage, followed by narrow bands 202H and 202L receiving approximately 90 percent. Towards the poles coverage exceeds 90 percent, with bands 202A, 202C, 202E, 202G, 202M, 202O, 202Q and 202S receiving approximately 95 percent of time coverage and bands 202B, 202D, 202F, 202N, 202P and 202R receiving over 100 percent of time coverage. The reduced coverage at lower latitudes exhibited by the exemplary pattern 200 of FIG. 2A can be compensated by raising the altitude in combination with the high inclination.

Figure 2B:
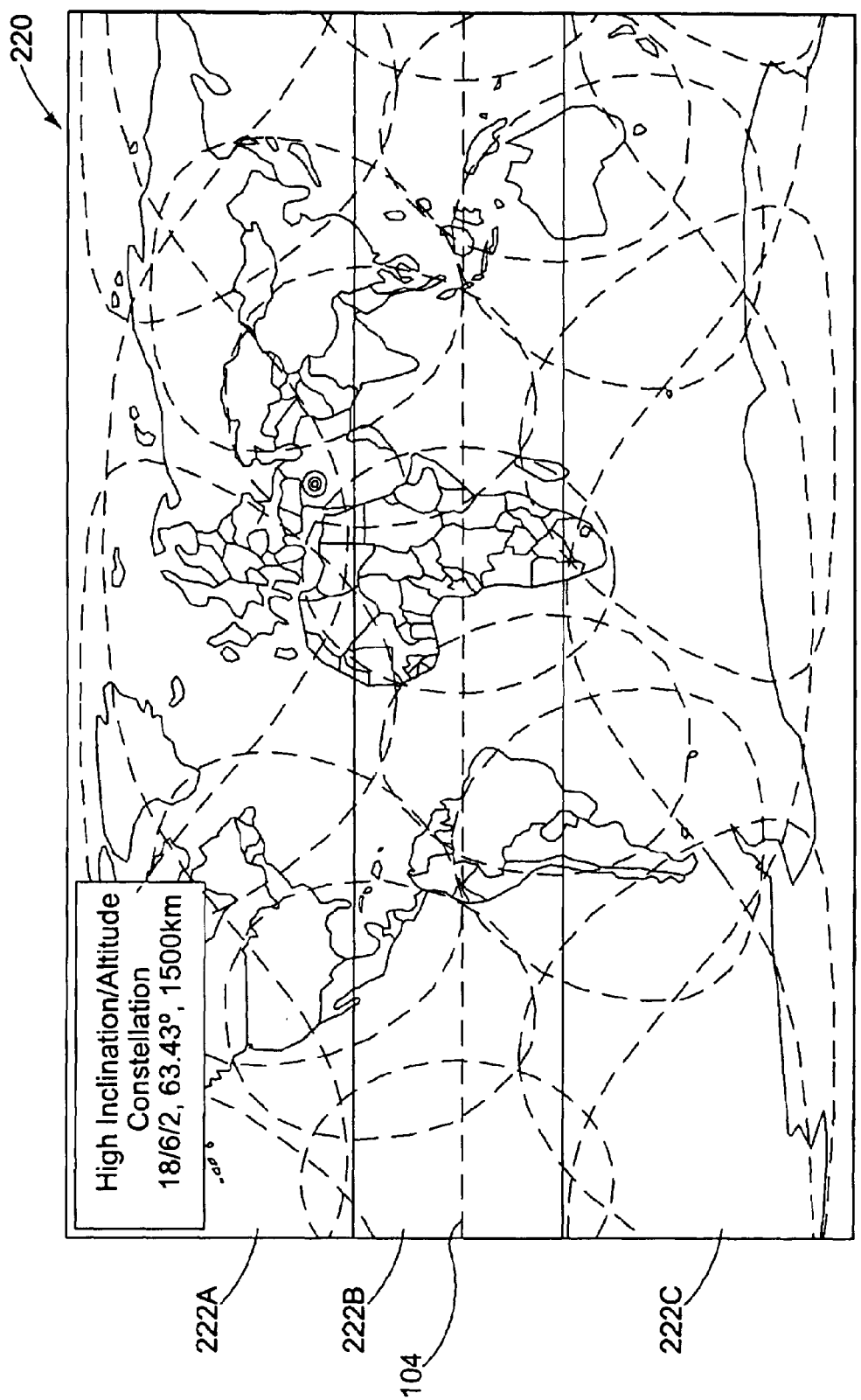
FIG. 2B illustrates coverage from a reference exemplary Earth observation constellation with fewer satellites using a high inclination and even higher altitude.

FIG. 2B illustrates a coverage pattern 220 from an exemplary Earth observation constellation using a high inclination and yet higher altitude. This constellation also includes 18 satellites in 6 planes at an inclination of 63.43°, but at an altitude of 1500 km. The orbits have 0 apsidal precession and produce near full Earth coverage. The pattern 220 provides approximately 90 percent of time coverage in a large equatorial band 222B and over 100 percent of time coverage in larger high and low latitude bands 222A and 222C.

It is possible to use an on-orbit refueling capability to enable satellites in the original constellation of FIG. 1A (24 satellites in 770-km, 52° orbits) to make low perigee passes over a target. However, the adjusted satellite will have to either undergo a plane change to 63.43° to maintain its perigee over the target or employ thrusters to keep its perigee in place. In either case, impracticably large amounts of propellant would need to be consumed.

However, an on-orbit refueling capability is still an important consideration in the satellite constellation configuration of the present invention. Refueling would allow one or more satellites to make continued low perigee passes over an area of interest. This capability, in turn, necessitates that the line of apses not rotate, which therefore drives the inclination to approximately 63.43° in the exemplary embodiment. The need to maintain nearly full global coverage with the original constellation at this inclination, in turn, drives the altitude higher than that for a 52° inclination. Determining a precise optimum altitude for the constellation can be determined through trade studies and further analysis performed involving steady-state resolution requirements, launch capabilities, number of satellites, altitude and sensor masses and capability (aperture size).

Figure 3:
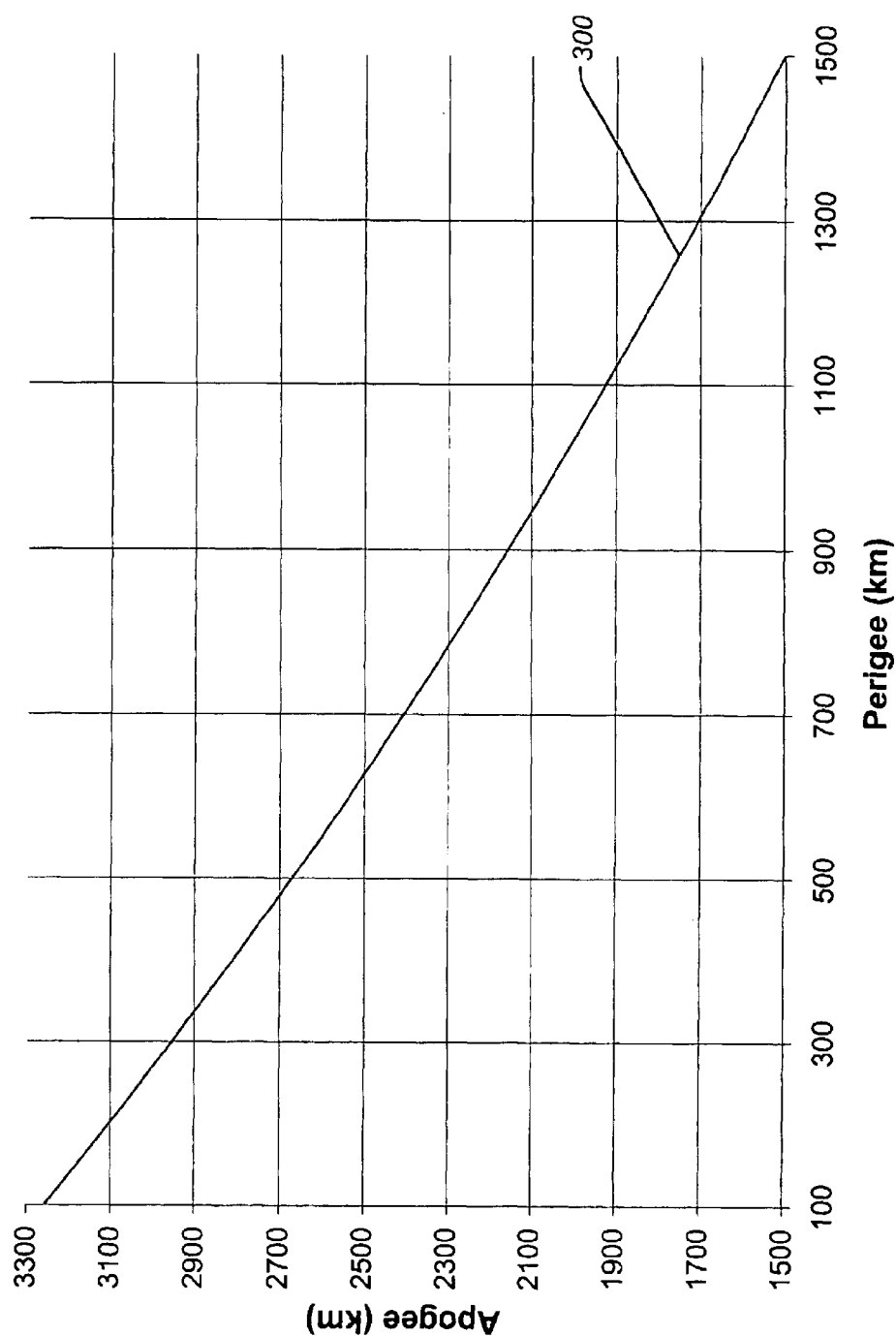
FIG. 3 illustrates an apogee versus perigee curve where nodal regression is constant.

FIG. 3 illustrates an apogee versus perigee curve 300 where nodal regression is constant. Embodiments of the invention can place one satellite in an elliptical orbit with low perigee for surge conditions. The apogee can be selected such that the nodal regression is kept constant. The period would change only slightly, as discussed hereafter. When surge conditions end, the satellite can be restored to original parameters with no plane change (minimal propellant). Minimal re-phasing maneuvers may be needed. A mission specific orbital study should reveal the lowest acceptable perigee along the curve 300 that should be used.

Figure 4A:
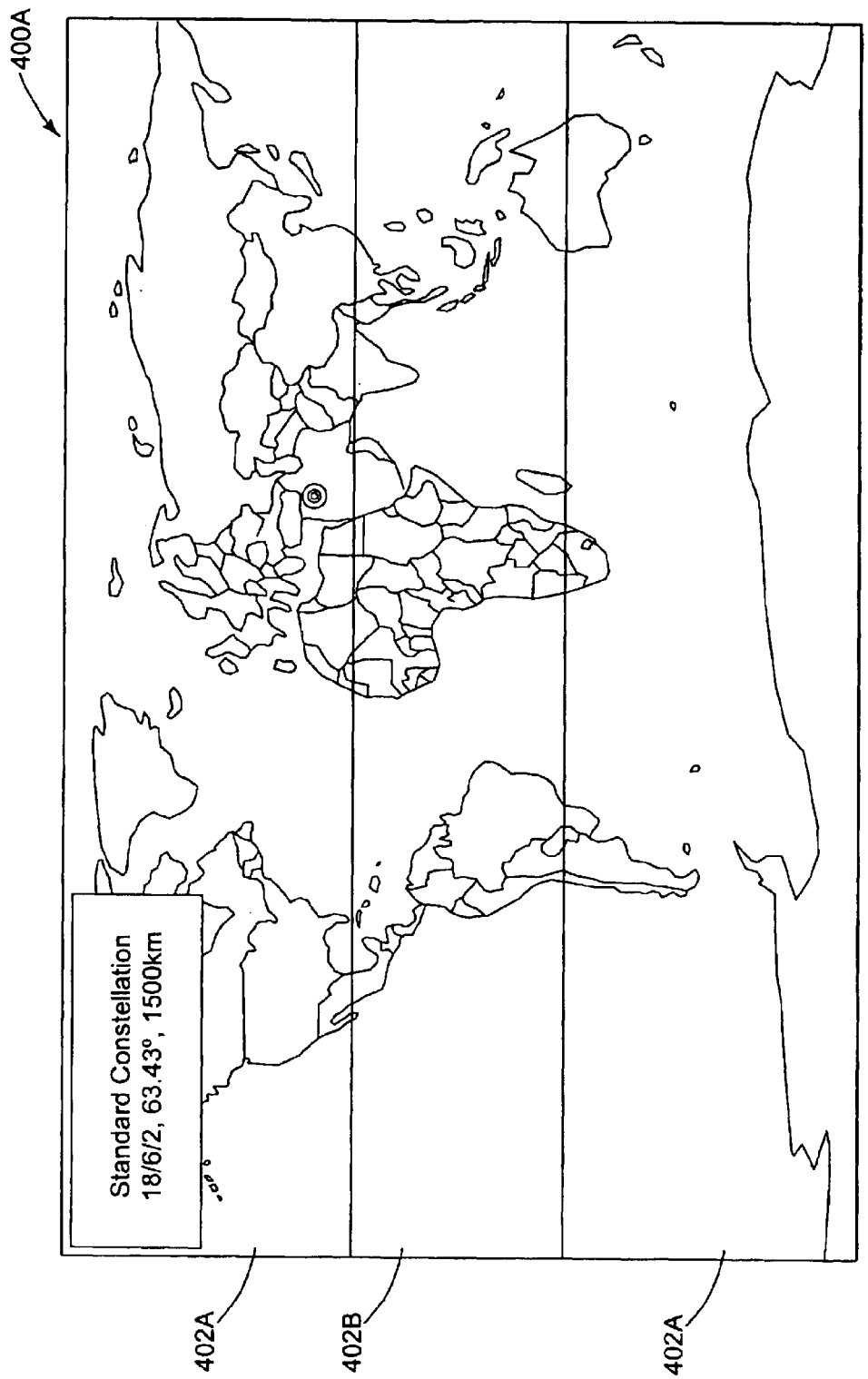
FIGS. 4A–4F illustrate coverage patterns for a reference exemplary constellation comparing baseline high altitude high inclination complete constellation to high altitude constellation using a single satellite in a low perigee pass elliptical orbit at various perigee/apogee altitudes.
Figure 4B:
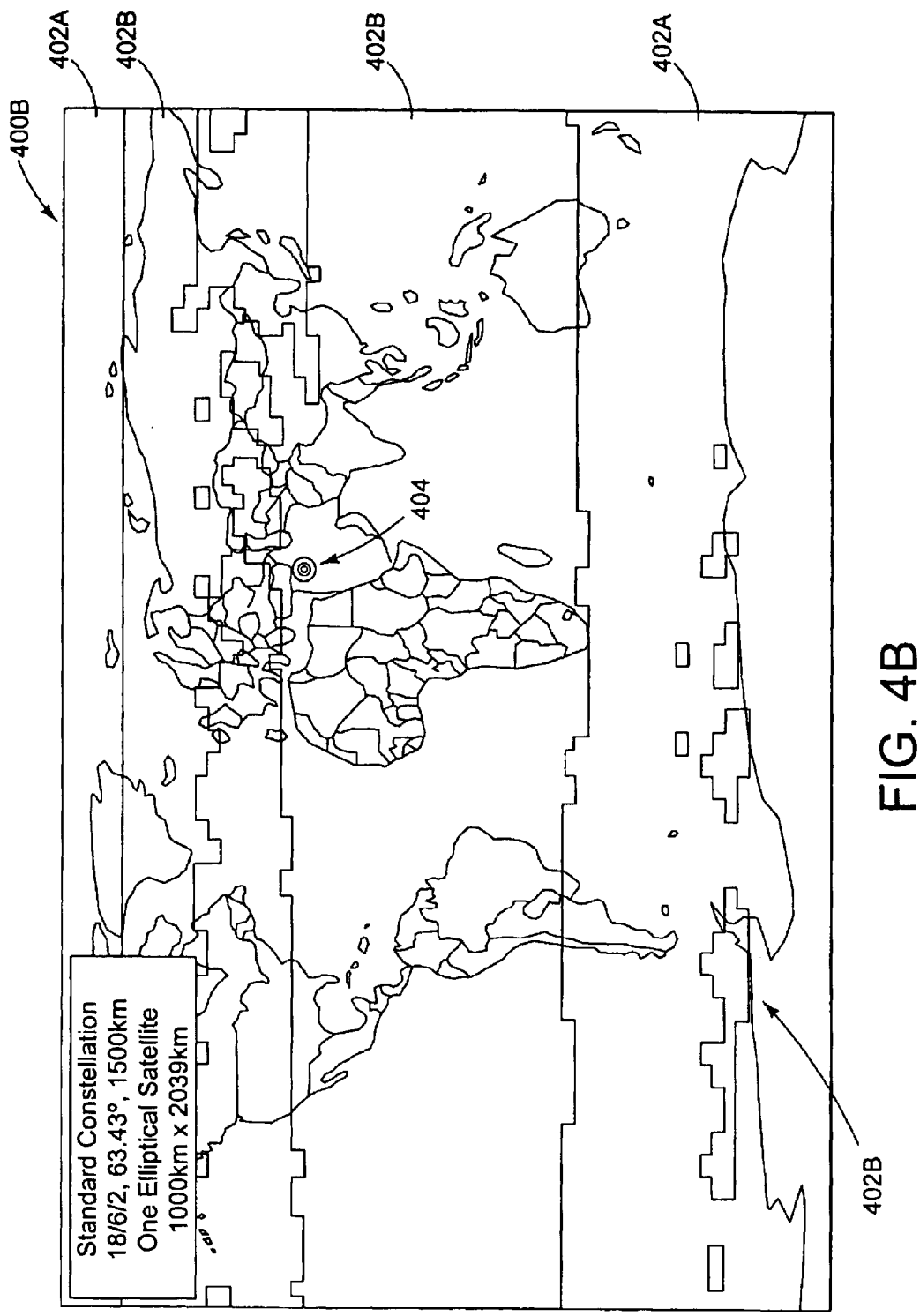

FIGS. 4A–4F illustrate coverage patterns for exemplary constellations using a single satellite having an elliptical orbit. FIG. 4A illustrates the coverage pattern 400A of the standard baseline constellation with all 18 satellites in 6 planes in 1500 km circular orbits. The coverage pattern 400A comprises two levels of coverage 402, one central band receiving approximately 95 percent of time coverage 402B and two northern and southern bands each receiving over 100 percent of time coverage 402A. FIG. 4B illustrates the same constellation except that one satellite is in a 1000 km×2039 km elliptical orbit. The argument of perigee of the elliptical satellite is set at 37°. In the example, perigee occurs over a representative middle east location 404 at approximately latitude 33° and longitude 43° approximately once per day. The location 404 represents a point of interest for observation with the satellite sensors. The elliptical satellite will make perigee passes over middle latitudes. The longitude of the low pass will shift westward for each orbit but will repeat over the area of interest after about one day. The coverage pattern 400B of FIG. 4B is similar to that of FIG. 4A except that coverage in the northern and southern bands is slightly degraded with patches receiving approximately 95 percent of time coverage as the central band.

Figure 4C:
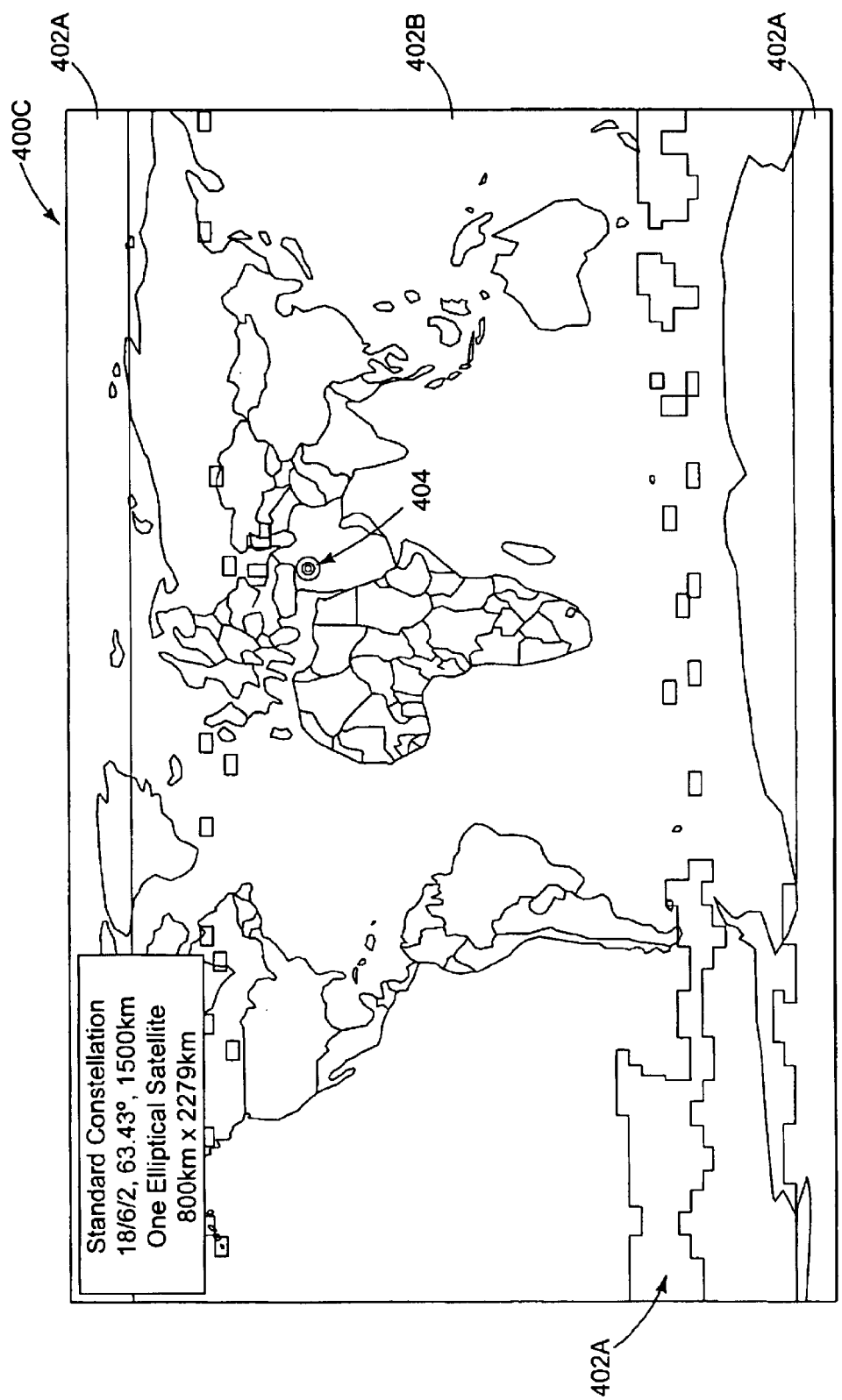
Figure 4D:
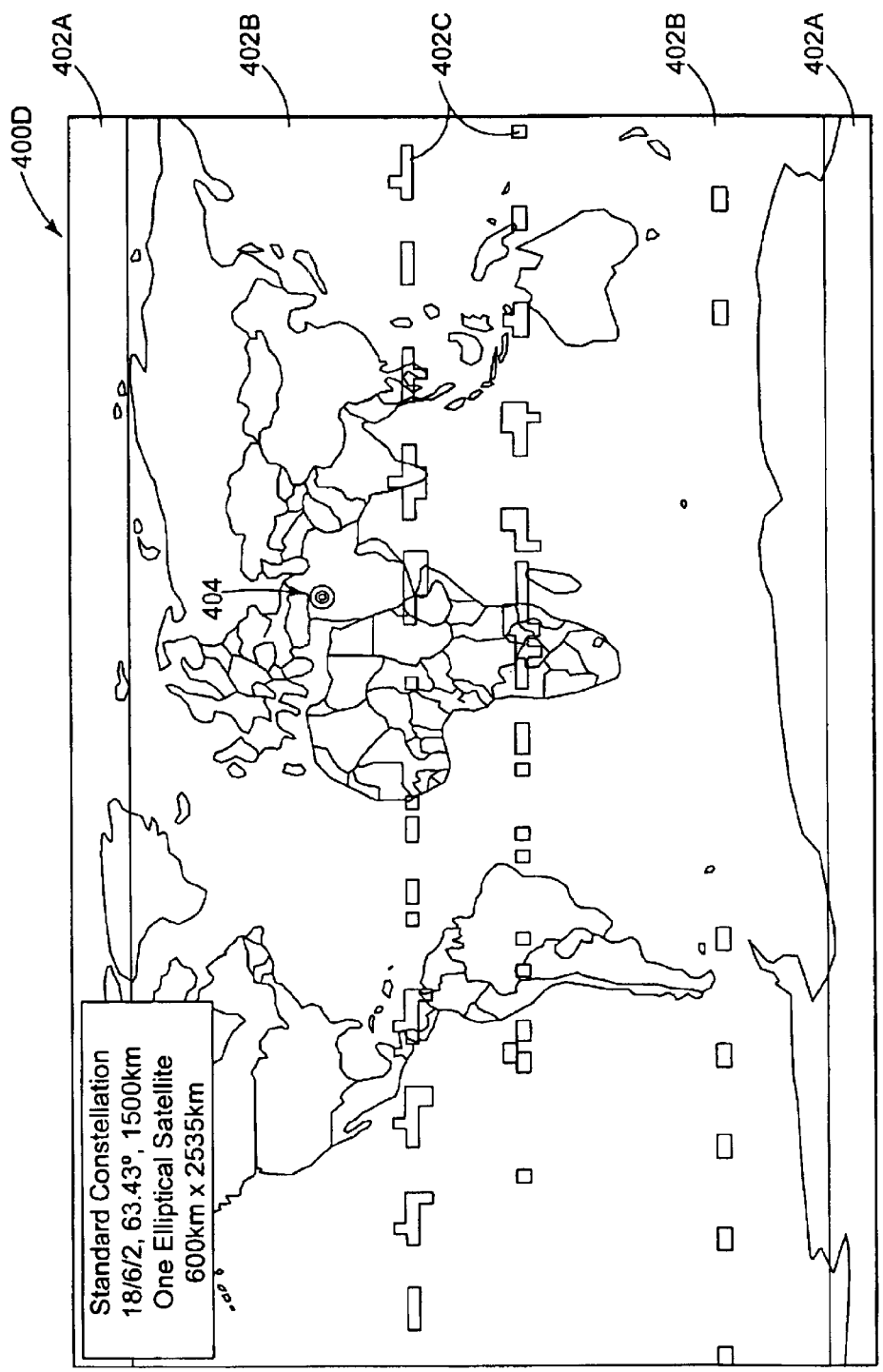
Figure 4E:
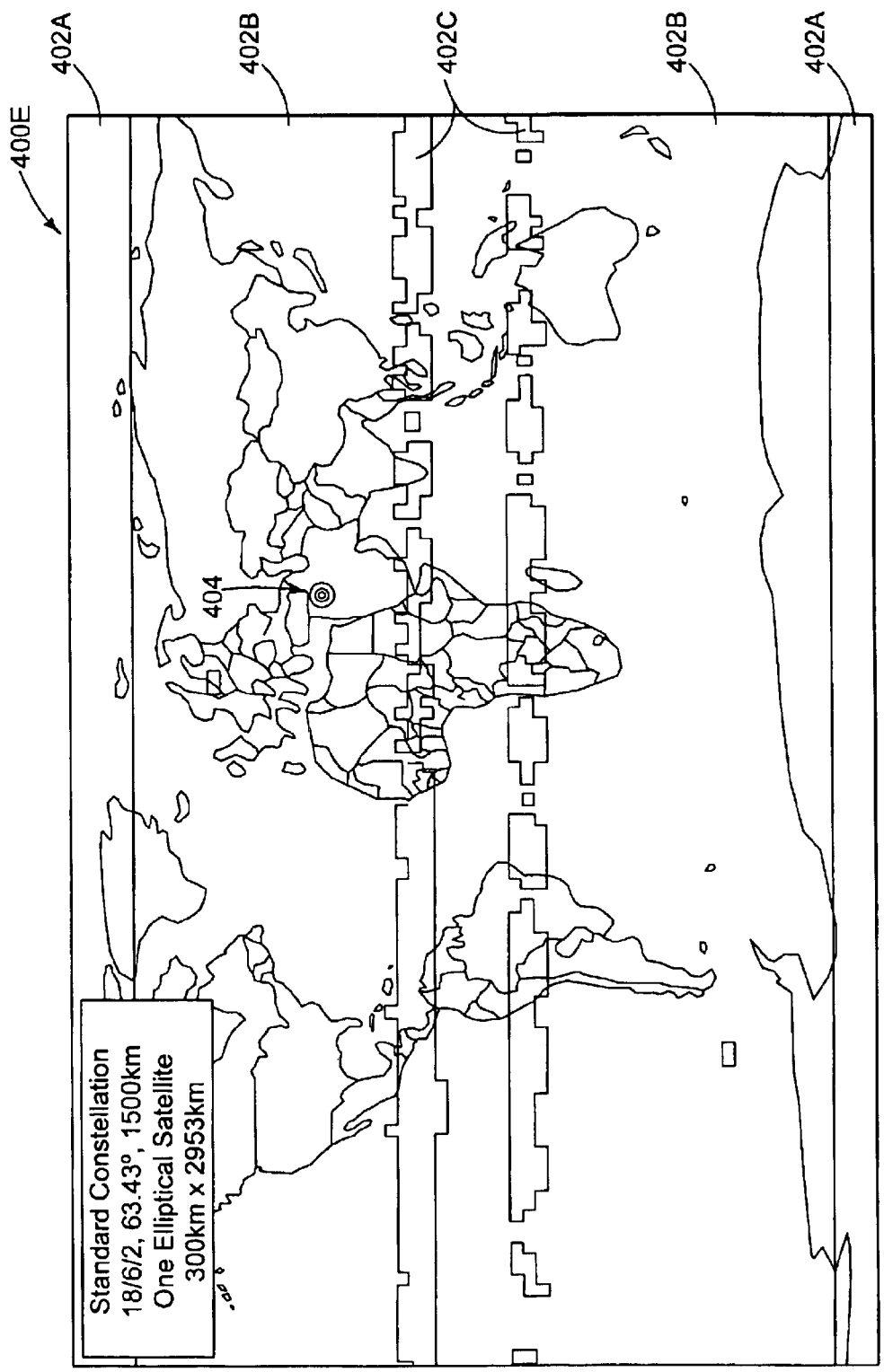
Figure 4F:
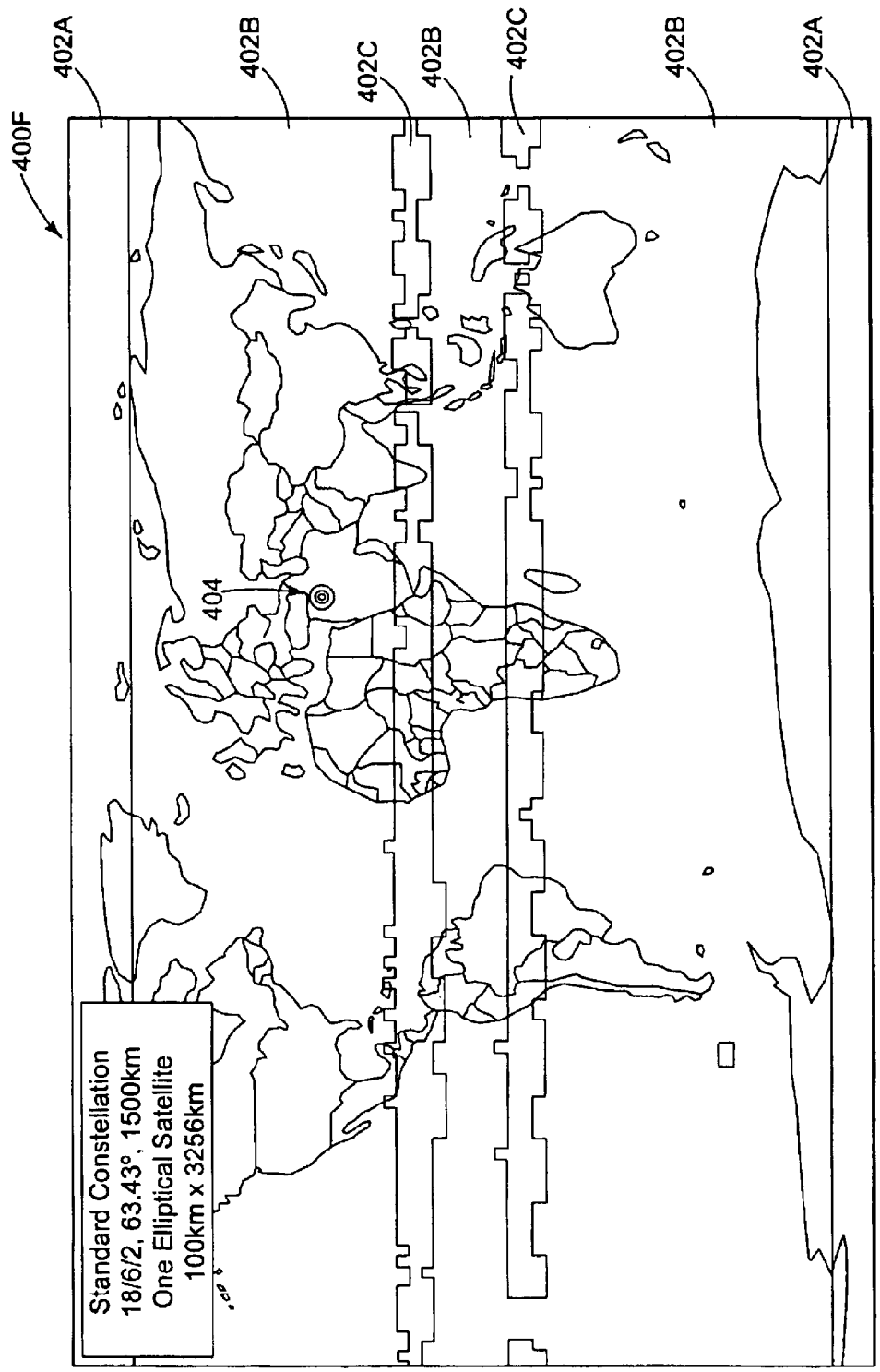

FIGS. 4C–4F illustrate successive alterations to the orbit of the low pass elliptical satellite from the same original constellation of 18 satellites in 6 planes with 1500 km orbits. FIG. 4C shows the coverage pattern 400C where the elliptical satellite is in an 800 km×2279 km orbit. The pattern 400C shows more erosion in the northern and southern regions where these regions are now dominated by areas receiving approximately 95 percent of time coverage 402B. Only the highest and lowest latitudes still have solid bands receiving over 100 percent of time coverage 402A. FIG. 4D shows the coverage pattern 400D where the elliptical satellite is in a 600 km×2535 km orbit. In this pattern 400D small patches receiving only approximately 90 percent of time coverage 402C (a third level) begin to appear in two horizontal lines on either side of the equator. FIG. 4E shows the coverage pattern 400E where the elliptical satellite is in a 300 km×2953 km orbit. In this pattern, the horizontal lines receiving approximately 90 percent of time coverage 402C become more pronounced. Finally, FIG. 4F shows the coverage pattern 400F where the elliptical satellite is in a 100 km×3256 km orbit. The trend continues in this pattern 400F where the horizontal lines receiving approximately 90 percent of time coverage 402C are even stronger.

As illustrated across FIGS. 4A–4F, the coverage pattern begins to erode with successively lower perigees of the elliptical satellite with patches of lower coverage appearing near the equator and generally reduced coverage overall. Of course, this decay is traded for the value of improved observation (higher resolution) provided over the location 404. Above a perigee of approximately 800 km global coverage is nearly the same as the standard full constellation at 1500 km (FIG. 4A). However this provides only a marginal improvement in the resolution, particularly over the point of interest, and is unlikely to justify repositioning. Below a perigee of approximately 600 km, global coverage is somewhat degraded compared to compared with the standard constellation. However, the coverage does not get significantly worse as the perigee is further lowered from 600 km to 100 km. In general, the effectiveness of sensors is inversely proportional to the distance from the sensor to the target, i.e. the altitude of the satellite, by a measurable exponent. Consequently, the maximum effectiveness of a constellation with one satellite at a low perigee is obtained by making this perigee as low as possible.

Figure 5A:
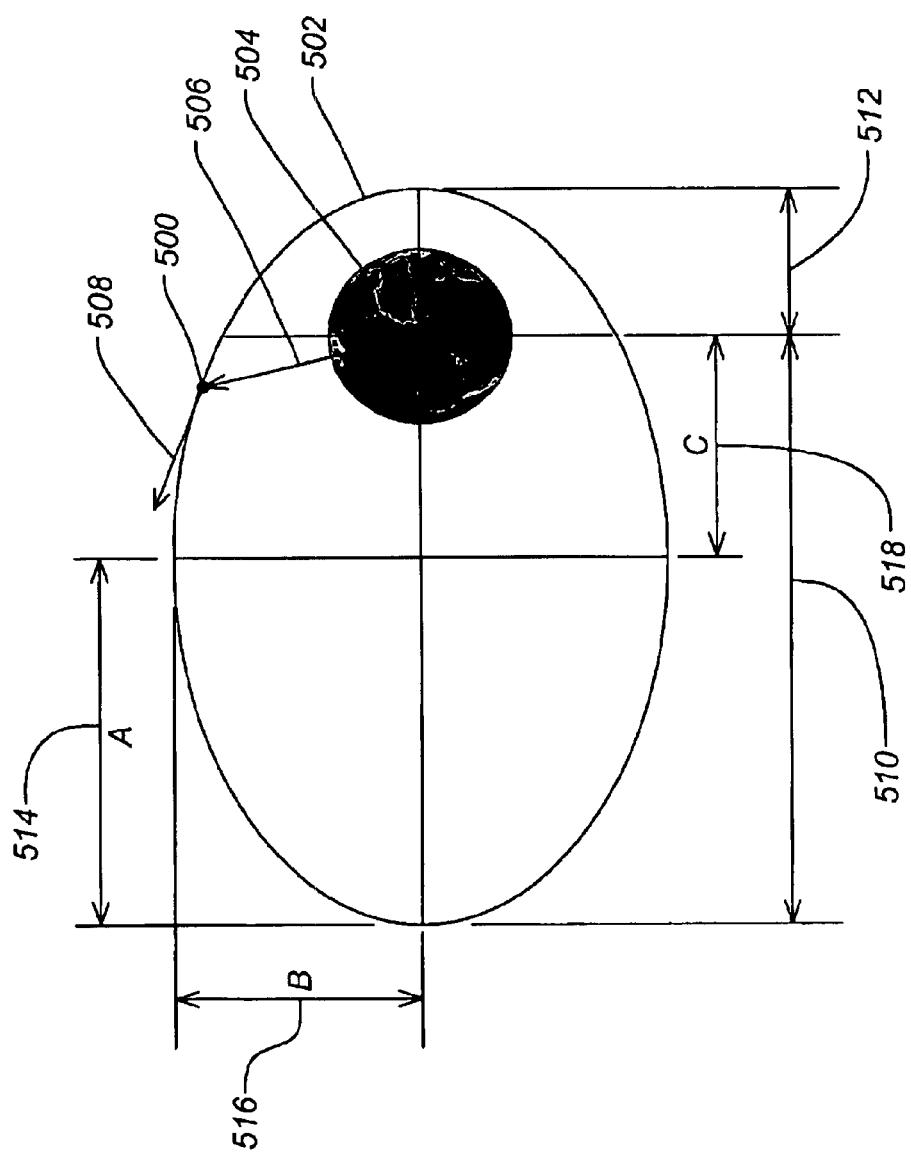
FIG. 5A illustrates parameters of a standard elliptical orbit.

FIG. 5A illustrates some parameters of a standard elliptical orbit. A satellite 500 is shown in an elliptical orbit 502 around the Earth 504. The satellite 500 has a position vector 506 and a velocity vector 508 relative to the center of the Earth 504. The radius of apogee 510 is the distance from the center of the Earth 504 to the farthest point on the ellipse. The radius of perigee 512 is the distance from the center of the Earth 504 to the nearest point on the ellipse. Note that in the discussion hereafter perigee and apogee altitudes, distances to the surface, rather than the center, of the Earth are used. The semi-major axis 514 is shown as the A measurement, the semi-minor axis 516 is shown as the B measurement, and the distance from the center of the orbit to one focus, i.e. at the Earth, is shown by the C measurement 518. Further information on orbital and constellation design can be found in Space Mission Analysis and Design, Wiley J. Larson and James R. Wertz (editors), pp. 79–182, 1991, which is incorporated by reference herein.

The effect on the orbital period when the nodal regression is maintained constant can be seen in the following exemplary table.

| Apogee (km) | Perigee (km) | Semi-major Axis (km) | Eccen. | Period (min) | Period (sec) | Orbits per Day |
| --- | --- | --- | --- | --- | --- | --- |
| 3256.3 | 100 | 8049 | 0.196 | 119.7 | 7186. | 12.02 |
| 3101.8 | 200 | 8021 | 0.180 | 119.1 | 7150. | 12.08 |
| 2952.7 | 300 | 7997 | 0.165 | 118.6 | 7117. | 12.13 |
| 2808.7 | 400 | 7975 | 0.151 | 118.1 | 7088. | 12.18 |
| 2669.6 | 500 | 7955 | 0.136 | 117.7 | 7062. | 12.23 |
| 2535.1 | 600 | 7938 | 0.121 | 117.3 | 7039. | 12.27 |
| 2405.0 | 700 | 7923 | 0.107 | 116.9 | 7019. | 12.30 |

-continued

| Apogee (km) | Perigee (km) | Semi-major Axis (km) | Eccen. | Period (min) | Period (sec) | Orbits per Day |
|---|---|---|---|---|---|---|
| 2279.1 | 800 | 7910 | 0.093 | 116.7 | 7002. | 12.33 |
| 2157.2 | 900 | 7899 | 0.079 | 116.4 | 6987. | 12.36 |
| 2039.1 | 1000 | 7890 | 0.065 | 116.2 | 6975. | 12.38 |
| 1924.6 | 1100 | 7883 | 0.052 | 116.1 | 6965. | 12.40 |
| 1813.6 | 1200 | 7877 | 0.038 | 115.9 | 6958. | 12.41 |
| 1706.0 | 1300 | 7874 | 0.025 | 115.8 | 6953. | 12.42 |
| 1601.5 | 1400 | 7871 | 0.012 | 115.8 | 6950. | 12.43 |

-continued

| Apogee (km) | Perigee (km) | Semi-major Axis (km) | Eccen. | Period (min) | Period (sec) | Orbits per Day |
|---|---|---|---|---|---|---|
| 1500.0 | 1500 | 7871 | 0.000 | 115.8 | 6949. | 12.43 |

Parameters of each orbit are shown on a separate line. The apogee and perigee altitudes are shown in the first two columns, followed, respectively by the semi-major axis, the orbit eccentricity, the period in minutes, the period in seconds, and the number of orbits in a solar day. The reference 1500 km circular orbit, as well as the eccentric orbits that have the same nodal regression, all make just over 12 orbits per solar day. The periods of the eccentric orbits are similar, but not quite the same. For a two-body case, a satellite that makes an exact integral number of orbits per day will have a daily repeating ground track, and will revisit the same targets each day. Due to nodal regression, the number of orbits per day needed for a daily repeating ground track is not an exact integer. For the situation considered here, the 237 km×3046 km case, interpolated between the second and third lines of the table, yields a daily repeating ground track. Different propagators, and different constants of pertubations may produce a somewhat different result. From constellation coverage, sensor resolution, and repeating ground track considerations, the ability to put one or more satellites into low perigee orbits can maximize overall constellation effectiveness. Atmospheric drag and orbital resonances were not considered for this exemplary illustration, however they can be included to improve model accuracy.

Figure 5B:
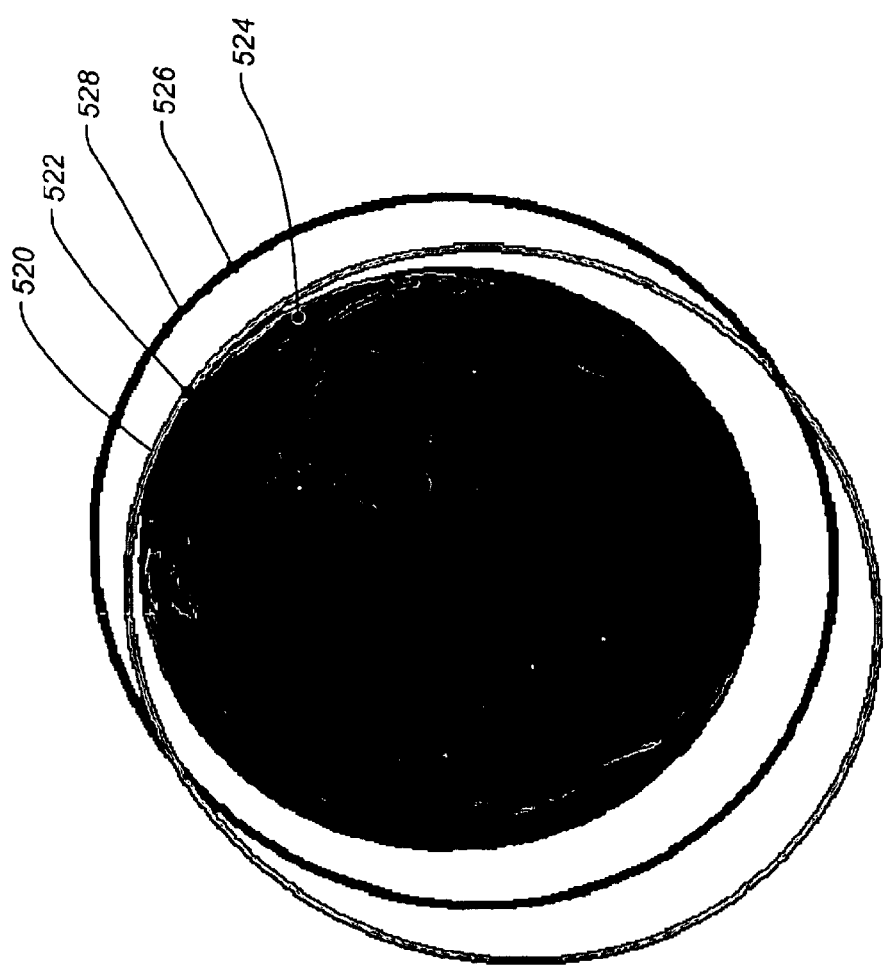
FIG. 5B illustrates how the orbit of the low pass elliptical satellite deviates from the circular orbit of the rest of the constellation.

FIG. 5B illustrates the elliptical orbit 520 of the satellite 522 (represented by the square) deviated from the circular orbit of the rest of the constellation. The satellite 522 in the elliptical orbit 520 (e.g., 237 km×3046 km) can make a low perigee pass over a mid-latitude location 524 of interest once per day, while maintaining the same nodal regression rate and a slightly different period as a satellite 526 in a 1500-km circular orbit 528 having the same inclination (63.43°). This gives an apsidal regression rate of 0 for the elliptical orbit.

A comparison of the fuel cost (indicated by $\Delta V$) between a constant nodal regression orbit and a single low perigee pass is shown in the following table.

| Apogee (km) | Perigee (km) | $\Delta V$ (m/sec) | Wt. Ratio | $\Delta V$ to Peri. (m/sec) | Excess $\Delta V$ (m/sec) | Plane Change (deg per day) | Plane Change $\Delta V$ (m/sec) | Time for Equal $\Delta V$ (days) |
|---|---|---|---|---|---|---|---|---|
| 3256 | 100 | 1362.7 | 0.344 | 711.4 | 651.3 | 0.783 | 112.4 | 5.80 |
| 3102 | 200 | 1259.2 | 0.322 | 654.7 | 604.5 | 0.712 | 100.9 | 5.99 |
| 2953 | 300 | 1156.5 | 0.300 | 599.0 | 557.5 | 0.643 | 90.2 | 6.18 |
| 2809 | 400 | 1054.7 | 0.278 | 544.3 | 510.4 | 0.577 | 80.0 | 6.38 |
| 2670 | 500 | 953.9 | 0.255 | 490.5 | 463.4 | 0.513 | 70.5 | 6.58 |
| 2535 | 600 | 853.8 | 0.232 | 437.6 | 416.2 | 0.452 | 61.4 | 6.77 |
| 2405 | 700 | 755.0 | 0.208 | 385.7 | 369.3 | 0.394 | 53.0 | 6.97 |
| 2279 | 800 | 657.0 | 0.184 | 334.6 | 322.4 | 0.338 | 44.9 | 7.17 |
| 2157 | 900 | 560.1 | 0.159 | 284.4 | 275.6 | 0.284 | 37.4 | 7.37 |
| 2039 | 1000 | 464.2 | 0.134 | 235.1 | 229.1 | 0.232 | 30.2 | 7.58 |
| 1925 | 1100 | 369.5 | 0.108 | 186.5 | 183.0 | 0.182 | 23.5 | 7.78 |
| 1814 | 1200 | 275.6 | 0.082 | 138.7 | 136.9 | 0.134 | 17.1 | 7.98 |
| 1706 | 1300 | 182.6 | 0.055 | 91.7 | 90.9 | 0.088 | 11.1 | 8.19 |
| 1602 | 1400 | 91.0 | 0.028 | 45.5 | 45.5 | 0.043 | 5.4 | 8.40 |
| 1500 | 1500 | 0.0 | 0.000 | 0.0 | 0.0 | 0.000 | 0.0 | NA |

Again, each line identifies a different elliptical orbit having an indicated apogee and perigee at a constant nodal regression. The third column, showing $\Delta V$, indicates the change in velocity required for a "round trip" that is, starting from a 1500 km circular orbit, changing to an elliptical orbit having the same nodal regression, then returning to a 1500 km circular orbit. The weight ratio (in the fourth column) is the ratio of propellant weight to the initial vehicle weight (i.e. "wet" weight), also for a "round trip". The $\Delta V$ to lower the perigee only is shown in the fifth column and the excess $\Delta V$ to change the apogee is shown in the sixth column. The plane change in degrees per day is shown in the seventh column and the plane change $\Delta V$ in m/sec per day is shown in the eighth column. Finally, the days to equal $\Delta V$ is shown in the last column.

$\Delta V$ and propellant required for rephasing were not considered; the slightly different period of the elliptical and circular orbits can allow rephasing without using additional propellant. As shown in the third column, the $\Delta V$ to lower perigee only is considerably less. However, an orbit with a 1500 km apogee and a low perigee will have a different nodal regression rate from the 1500 km circular orbit, necessitating a plane change (seventh and eighth columns) if the satellite is to be restored to the 1500 km circular orbit and reinserted into the constellation. After the number of days shown in the last column, the $\Delta V$ required for this plane change will exceed the excess $\Delta V$ required to raise the apogee as well as lower the perigee. Thus, for a perigee pass of about 200 km, if the satellite is to remain in the elliptical orbit for six days or more, it is advisable to raise the apogee as well, so that the nodal regression follows the rest of the constellation.

The satellite can then be left in the elliptical orbit indefinitely. For the 237 km×3046 km case, it will revisit the target once each day. Alternatively, a satellite in a 1500 km× low perigee elliptical orbit, with different nodal regression from the rest of the constellation, can undergo a node shift with a minimal use of propellant by adjusting the orbital parameters to cause the line of nodes to slowly shift back to their original position. However, this could take considerable time.

Note that this ΔV comparison is shown only as an example. In practice, the high apogee/low perigee orbit is best obtained by first raising the apogee, then lowering the perigee. The orbit is then restored by raising the perigee and lowering the apogee. However, the results are not much different than the example shown.

Figure 6A:
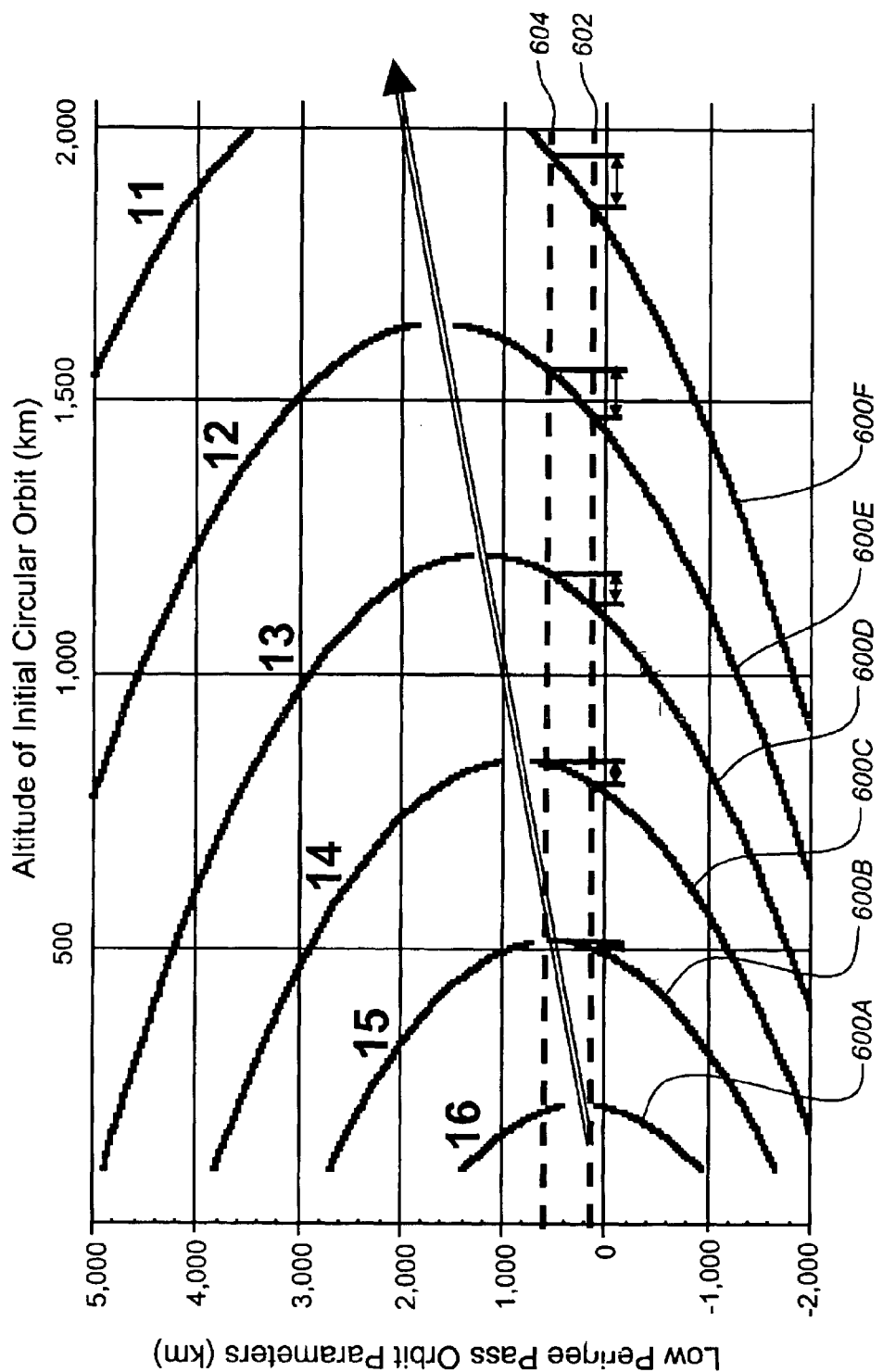
FIG. 6A is a plot from an exemplary MATHEMATICA program illustrating how low pass orbit perigee varies to maintain daily repeating ground tracks based upon initial circular constellation altitude.

FIG. 6A illustrates low perigee pass orbits with daily repeating ground tracks based upon initial altitude. A 63.43° orbit inclination is considered to keep the perigee from drifting (apsidal precession). For a satellite in a circular orbit at a given altitude that is redeployed into an elliptical orbit, many apogee/perigee combinations can preserve the nodal regression rate (thereby minimizing degradation of the constellation integrity and facilitating reinsertion of the low pass satellite into the constellation). However, if the elliptical orbit is required to have a daily repeating ground track, the choice of apogee/perigee combinations is limited. A repeating ground track orbit will make approximately an integral number of orbits per day. (The actual number will be slightly greater than an integer, due to the need to compensate for nodal regression.) The curves 600A–600F (referenced generally as 600) show the altered apogees (upper half) or perigees (lower half) that yield daily repeating ground tracks, while preserving the nodal regression rate of the initial circular orbit. The approximate number of orbits per day is indicated by each curve 600, e.g. curve 600E is for approximately 12 orbits per day.

The approximate range of practical low perigee passes is shown by the dashed lines 602 and 604. Perigees below the lower line 602 may occur within the Earth's atmosphere, or even below the Earth's surface, so they are not physically realizable. Perigees above the upper line 604 may be too high to be worth the expense of redeployment. The range of practical perigee passes can therefore influence the choice of the initial circular orbit. For each curve 600B–600F, a range of reasonable initial circular orbits is shown defined by the intersection of each curve 600 (on the perigee side) and the lower and upper lines 602 and 604. (Curve 600A yields no significant range of acceptable circular orbits on the perigee half of the curve 600A.)

For a given daily repeat integer, as higher initial circular orbits are considered, their period will approach that needed for a repeating ground track. Consequently, the required elliptical orbit will approach the original circular orbit. However, once the period of the circular orbit lengthens so that the number of orbits per day drops just below a (near) integer, the elliptical orbit will need to be highly eccentric to have a period necessary for a (near) integer number of daily orbits.

Figure 6B:
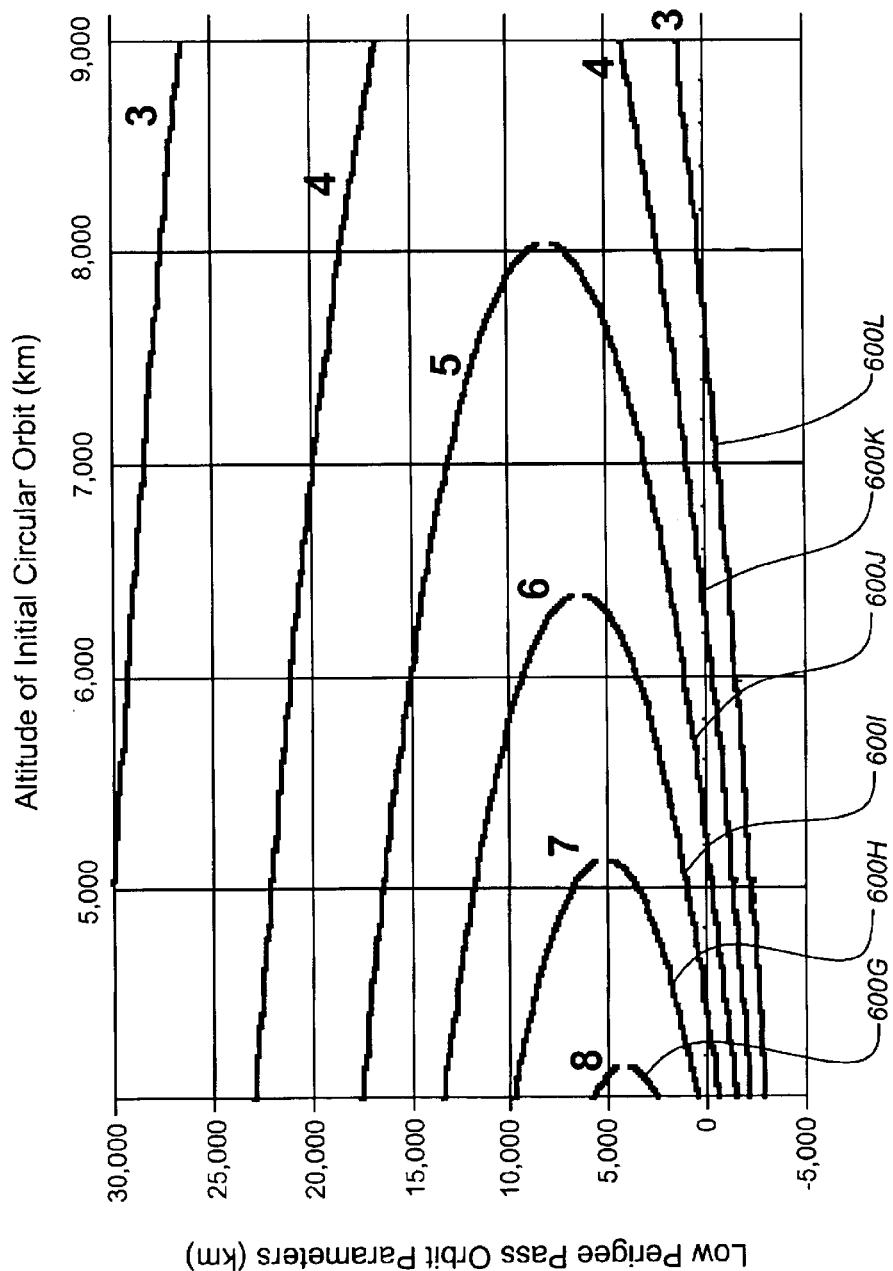
FIG. 6B is a plot from an exemplary MATHEMATICA program illustrating low pass perigee orbits for very high initial circular orbits and daily repeating ground tracks.

FIG. 6B illustrates low perigee pass orbits for very high initial circular orbits. In these cases, more than one low perigee pass orbit is possible for a given initial circular orbit. Here again, orbits with a 63.43° inclination are considered. The curves 600G–600L show the altered apogees (upper half) or perigees (lower half) that yield daily repeating ground tracks, while preserving the nodal regression rate of the initial circular orbit. Most of the initial altitudes in the range shown in FIG. 6B have more than one nodally-adjusted daily repeating ground track orbit associated with them. However, the apogees required may be impracticably high in some cases.

FIGS. 7A–7D illustrate an exemplary baseline constellation using 1500 km altitude×63.43° inclination circular orbits with one or more satellites in an exemplary low pass 237 km×3046 km elliptical orbit centered over a representative mid-latitude location. Time percentage coverage patterns 700A–700D of each constellation with one or more satellites redeployed into elliptical orbits are shown.

Figure 7A:
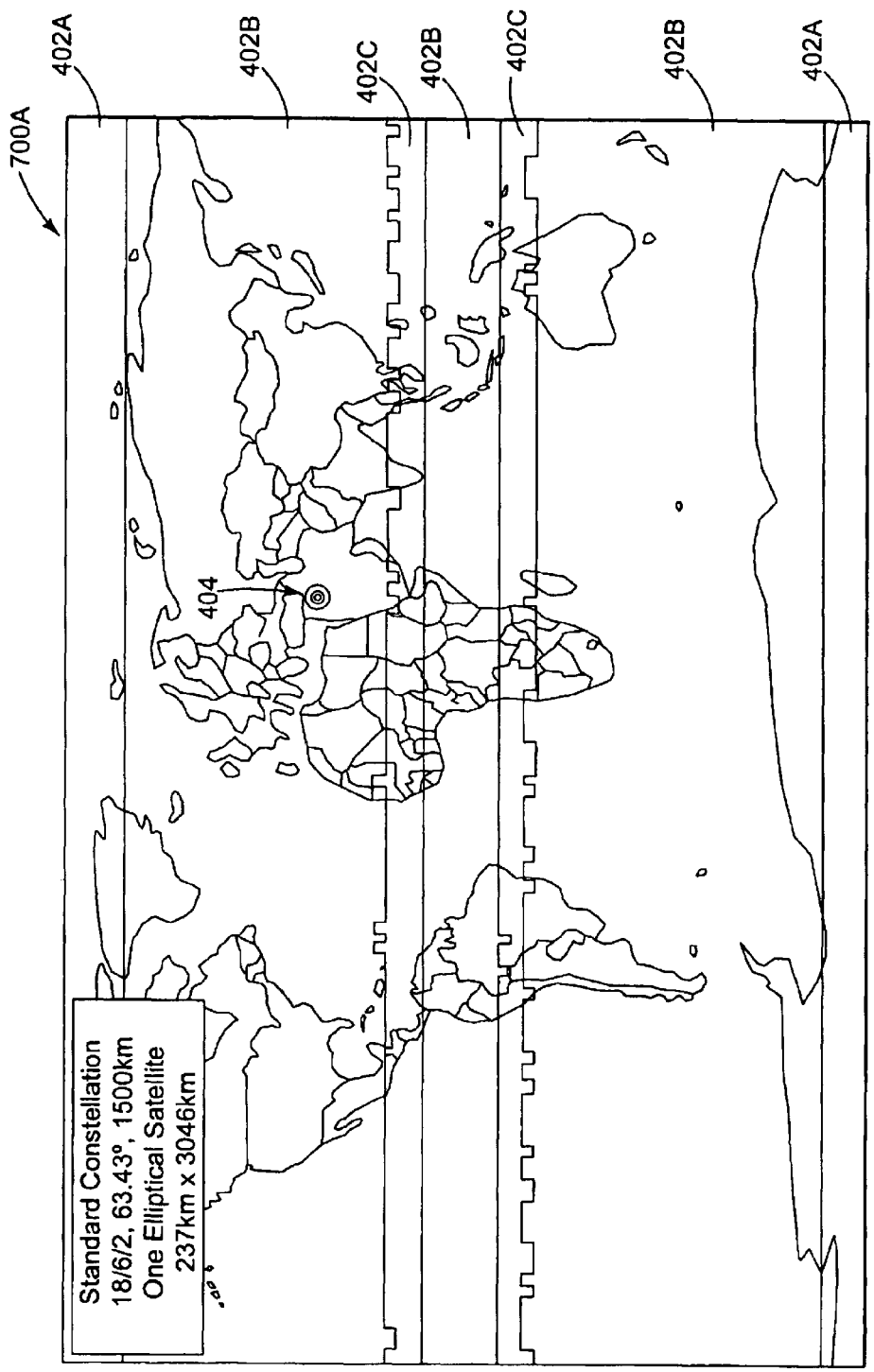
FIGS. 7A–7D illustrate coverage of the exemplary baseline high altitude high inclination constellation using 1500 km×63.43° inclination circular orbits with one or more satellites from various planes in a 237 km×3046 km low pass elliptical orbit.

FIG. 7A shows a pattern 700A from the standard constellation with one elliptical satellite. The pattern 700A is very similar to that of FIG. 4D, shown previously. Two bands receiving approximately 90 percent of time coverage 402C surround an equatorial band receiving approximately 95 percent of time coverage. Two more relatively wide bands provide coverage of approximately 95 percent to the upper and lower latitudes and coverage over 100 percent (more than one satellite coverage) is received near the poles.

Figure 7B:
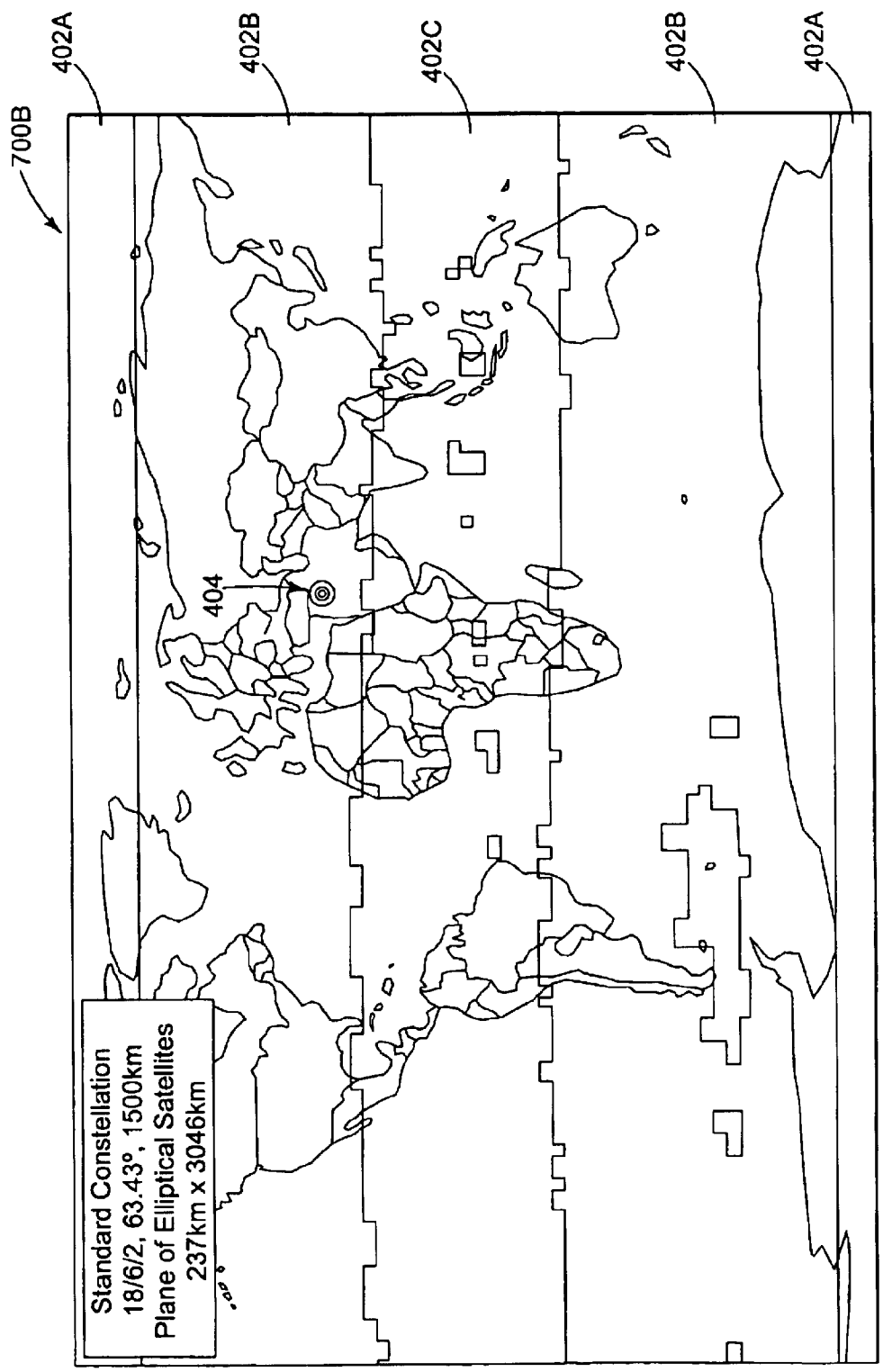

FIG. 7B shows a pattern 700B from the standard constellation with three satellites, from one entire plane, using elliptical orbits. In this case, the equatorial band receives approximately 90 percent of time coverage 402C. Large bands receiving approximately 95 percent of time coverage 402B are in the upper and lower latitudes and over 100 percent of time coverage 402A is received at the poles.

Figure 7C:
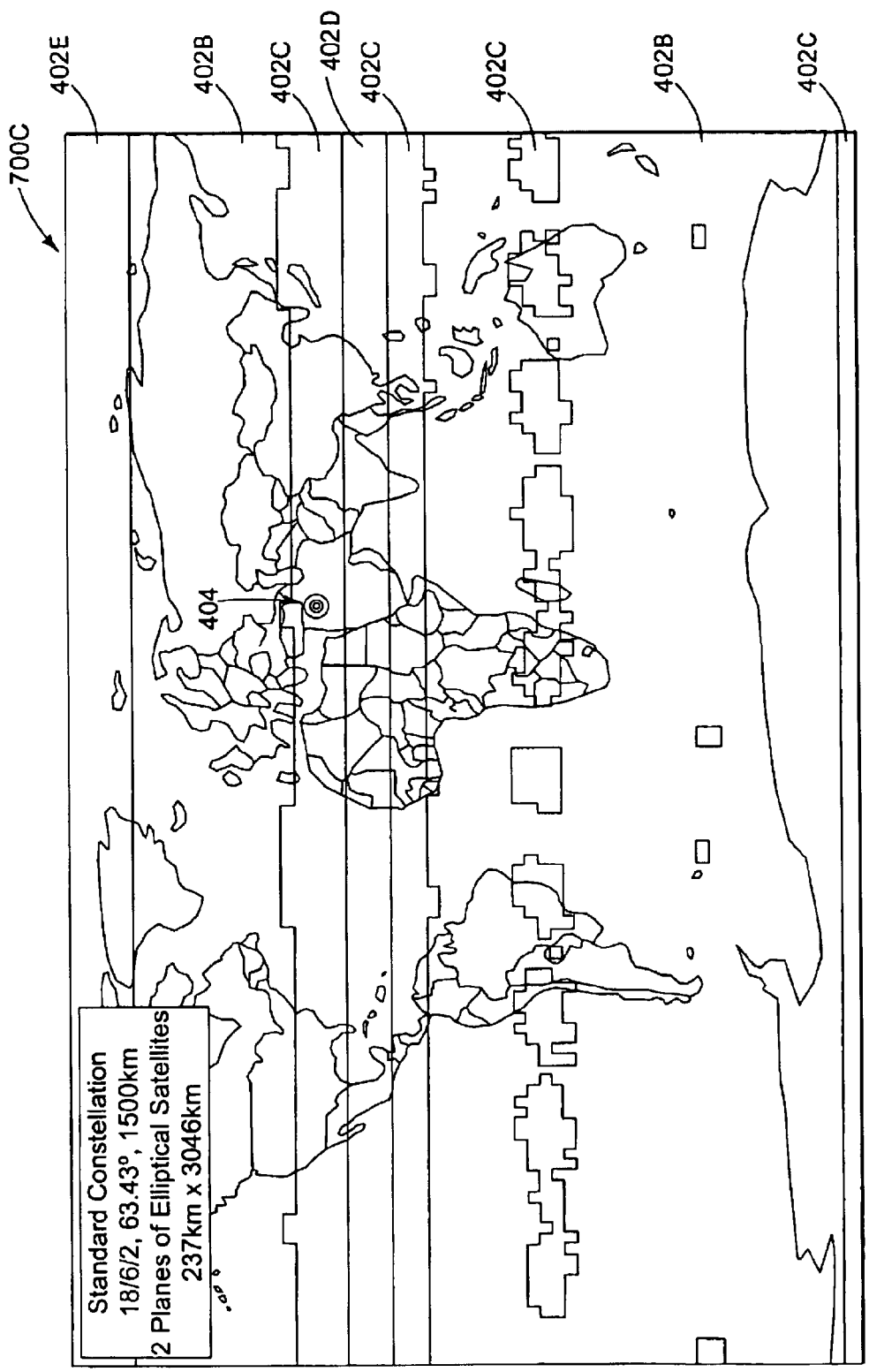
Figure 7D:
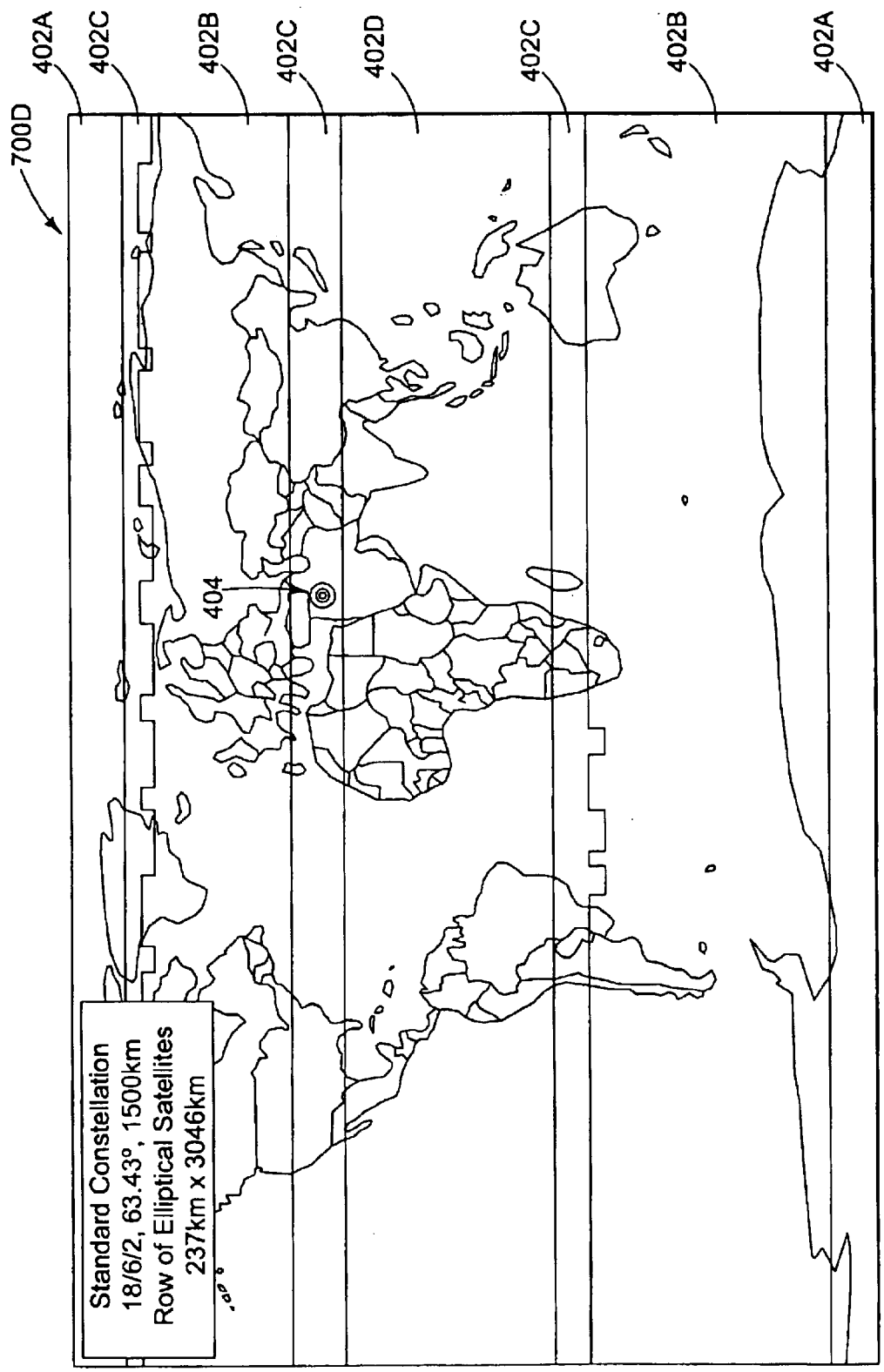

FIG. 7C shows a pattern from the standard constellation with six satellites, from two entire planes, using elliptical orbits. This pattern 700C shows more variance than the preceding patterns and almost no areas receiving over 100 percent of coverage. A drop in general coverage is experienced above the equator with a band receiving only approximately 80 percent of time coverage bounded by bands receiving approximately 90 percent of time coverage. A slight drop is also experienced south of the equator with patches receiving approximately 90 percent of time coverage 402C. The high northern and southern latitudes receive over 95 percent of time coverage 402B. In addition, the southern pole receives approximately 90 percent of time coverage 402C and the northern pole receives only approximately 50 percent of time coverage.

If one satellite per plane, forming one "row" of satellites, is redeployed into an elliptical orbit with a daily repeating ground track, then six perigee passes per day are possible for a mid-latitude target, e.g. location 404. This configuration is approximated by the coverage pattern 700D shown in FIG. 7D. This pattern 700D shows a large equatorial band receiving approximately 80 percent of time coverage 402D bounded by two smaller bands, each receiving approximately 90 percent of time coverage 402C. These bands are further bounded by bands in the northern and southern latitudes, each receiving approximately 95 percent of time coverage 402B. A very narrow band receiving approximately 90 percent of time coverage 402C is also found in the high northern latitudes. Finally, coverage exceeds 100 percent 402A at both poles.

Figure 8A:
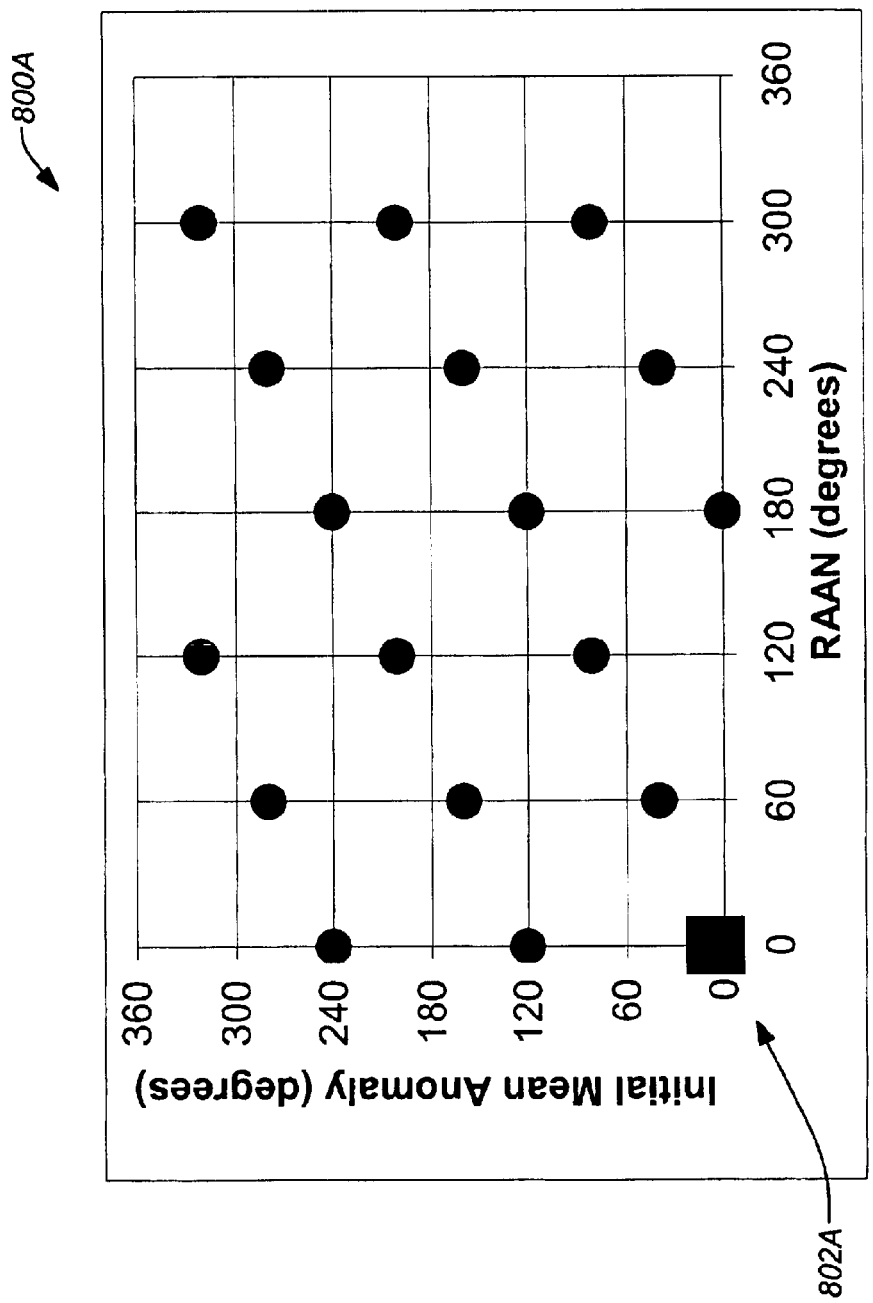
FIGS. 8A–8D are schematic illustrations of which satellites are used from the baseline exemplary constellation as the low pass elliptical satellites for the coverage patterns shown in FIGS. 7A–7D.
Figure 8B:
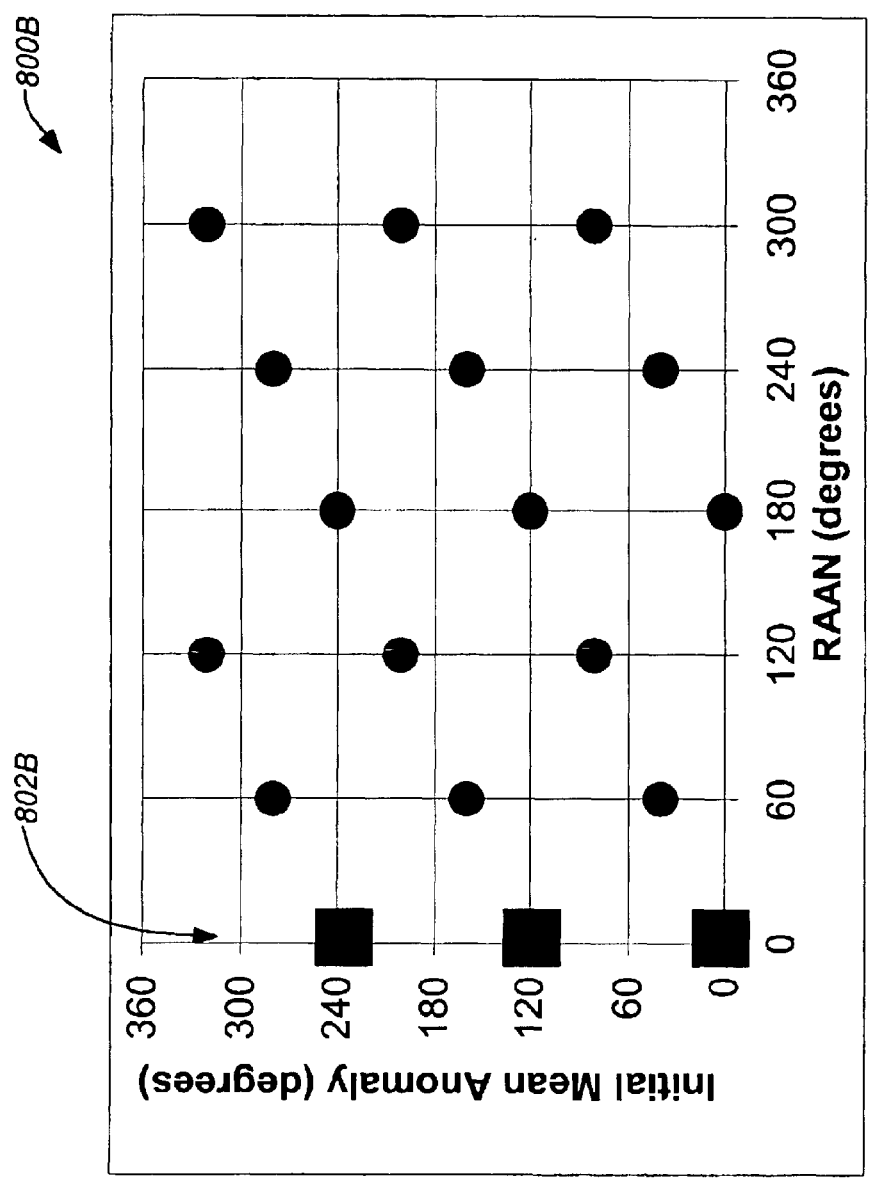
Figure 8C:
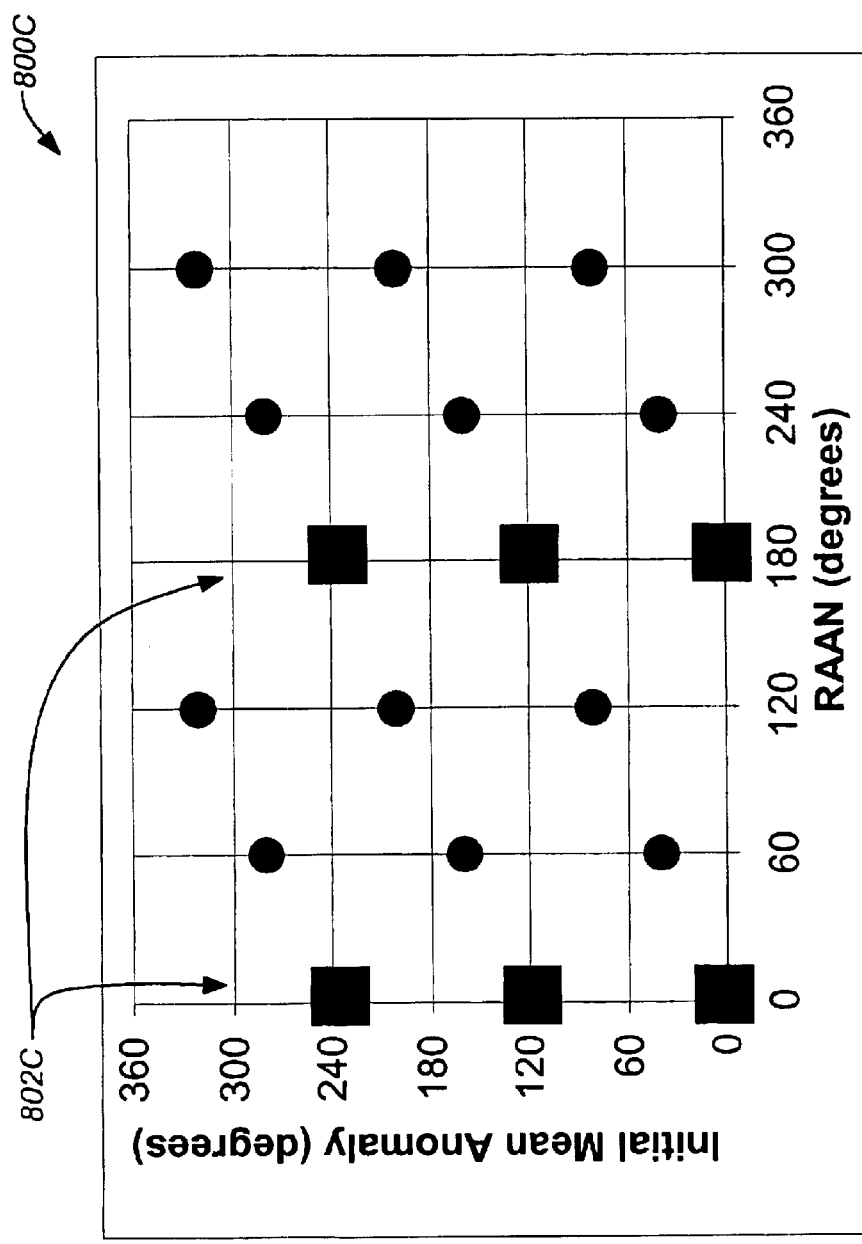
Figure 8D:
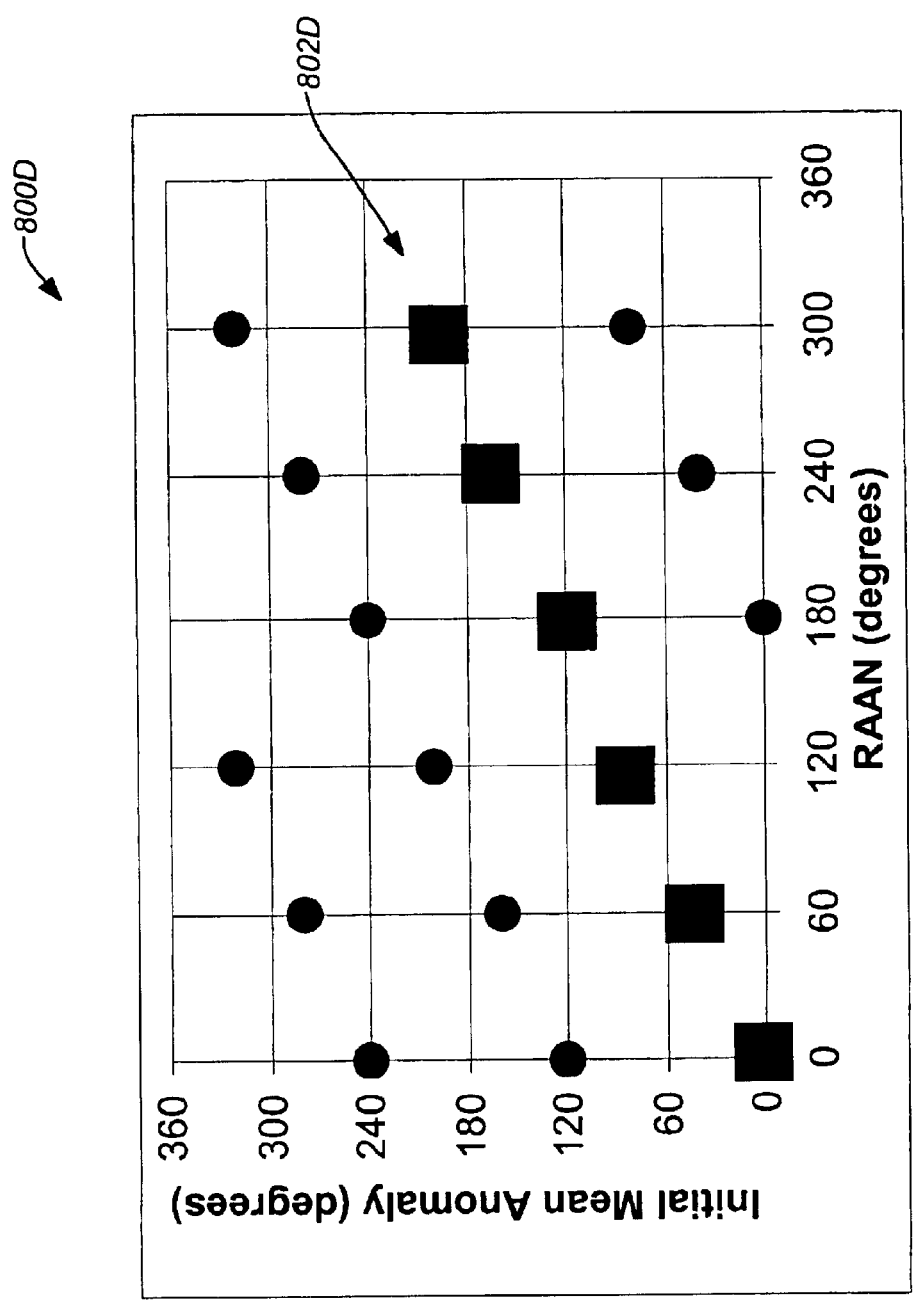

FIGS. 8A–8D are schematic illustrations of the exemplary constellation configurations corresponding respectively to the coverage patterns 700 of FIGS. 7A–7D. Constellation configurations are shown schematically, with each satellite in a circular orbit (1500 km) indicated by a circle and each satellite in an elliptical orbit (237 km×3046 km) indicated by a square. FIG. 8A shows a constellation 800A comprising the standard pattern but with a single satellite 802A having an initial mean anomaly of 0° and an right ascension of ascending node (RAAN) of 0° in the elliptical orbit. FIG. 8B shows a constellation 800B comprising the standard pattern but with an entire plane of satellites 802B, each having an initial right ascension of ascending node (RAAN) of 0°, in elliptical orbits. FIG. 8C shows a constellation 800C comprising the standard pattern but with two entire planes of satellites 802C, one plane having an initial RAAN of 0° and another having an initial RAAN of 180°, in elliptical orbits. Finally, FIG. 8D shows a constellation 800D comprising the standard pattern but with one satellite from each plane, making a "row" of satellites 802D, in elliptical orbits.

3. Analysis and Simulation

Analysis and simulation to evaluate embodiments of the invention can be performed using a commercially-available tool for doing mathematics by computer, such as MATHEMATICA. Programs such as MATHEMATICA can be viewed as high-level programming languages in their own right. The discussion hereafter is applicable to MATHEMATICA to illustrate principles of orbital design encompassing the present invention, however, those skilled in the art will understand how these principles can be applied to other similar mathematics tools.

MATHEMATICA can be used to generate plots of apogees and perigees of repeating ground track elliptical orbits having the same nodal regression rate as a given circular orbit as a function of altitude of the latter. A J2 perturbation was used. This accounts for the Earth's oblate shape; i.e., its equatorial bulge, though not for the much smaller perturbations due to asymmetries in the bulge. In MATHEMATICA, comments can appear anywhere in the program, and are set off from executable code using parentheses and asterisks, e.g. (* comment text *).

FIGS. 6A and 6B are plots of data from of an exemplary MATHEMATICA program showing calculated low perigee pass orbit parameters for given initial circular orbits. The radius of the Earth is used to convert from radius of circular orbit to altitude, and then from radius of apogee and perigee of ellipse to their altitudes. The curves shown in the FIGS. 6A and 6B, as well as the 237 km×3046 km orbit that results from applying the program to an initial circular orbit of 1500 km, corresponds to using an Earth radius of 6371 km. This is the radius of a sphere having the same volume as the Earth. Alternatively, one can use the Earth equatorial radius of 6378 km. This yields an orbit of 265 km×3004 km. The orbital analysis tool SATELLITE TOOL KIT uses 6378 km for the Earth's radius. Elliptical orbits generated by the MATHEMATICA program using this radius give repeating ground track plots in SATELLITE TOOL KIT. The exemplary MATHEMATICA code is as follows.

```
(* Repeating Ground Track Orbits With Nodal Regression *)
(* Held Same as a Given Circular Orbit *)
(* Basic parameters *)
j2 = 0.00108263;
(* Rer = 6371.0; Radius of Earth in km*)
Rer = 6378.165653; (* Radius of Earth in km*)
mu = 3.986005*10^5; (* GM in km^3/sec^2 *)
(*Characteristics of initial circular orbit*)
(*Nodal Regression in degrees/day*)
(* inclin=63.434949; inclination in degrees *)
inclin=63.434949; (* inclination in degrees *)
omegadotcd[hc__]:=
-2.06474*(10^14)*((hc+Rer)^-3.5)*Cos[inclin*Degree];
(*where hc is altitude of circular orbit above Earth's surface*)
periodc[hc__]:=0.00016587*((hc+Rer)^1.5);
(*Characteristics of elliptical orbit with same nodal regression*)
(* and daily repeating ground track *)
(a = h + Rer *)
(* omegadotj2 =-1.5*(3.1252977*(10^9)/a^-
1.5)*j2*((Re/a)^2)*(Cos[inclin*Degree])*(1-eccen^2)^-2 *)
(* =(360/ROUND(C19, 0)-ABS(D22/1440))*1436.068/360 *)
(* The period must be as follows, for # orbit/day = norbs *)
(* periode[hc__, norbs__]:=(360/norbs-
Abs[omegadotcd[hc]/1440])*1436.068/360; *)
periode[hc__, norbs__]:= 1/ (norbs])((1/1436.068) -
(1/1440)*omegadotcd[hc]/360 ));
(* Find semi-major axis from period: *)
(* aellipse[hc__, norbs__]:=
(mu*((60*periode[hc,norbs])^2)/(4*Pi*Pi))^(1/3); *)
aellipse[hc__, norbs__]:=(periode[hc,norbs]/0.00016587)^(2/3);
(* Find eccentricity from required nodal regression: *)
eellipse[hc__, norbs__]:=
  Sqrt[1-Sqrt]
-2.06474*(10^14)*(aellipse[hc,norbs]^-3.5)*Cos[inclin*Degree]
    /omegadotcd[hc] ]];
(* Find altitude of apogee of elliptical orbit *)
haellipse[hc__,norbs__]:=aellipse[hc,norbs]*(1+eellipse[hc,norbs])-Rer;
(* Find altitude of perigee of elliptical orbit *)
hpellipse[hc__,norbs__]:=aellipse[hc,norbs]*(1-eellipse[hc,norbs])-Rer;
Plot[{   haellipse[hcirc,11], hpellipse[hcirc,11],
         haellipse[hcirc,12], hpellipse[hcirc,12],
         haellipse[hcirc,13], hpellipse[hcirc,13],
         haellipse[hcirc,14], hpellipse[hcirc,14],
         haellipse[hcirc,15], hpellipse[hcirc,15],
         haellipse[hcirc,16], hpellipse[hcirc,16]}, {hcirc, 100, 2000},
PlotRange->{-2000,5000}, GridLines->Automatic]
"Inclination=" inclin
Date[]
```

Figure 9:
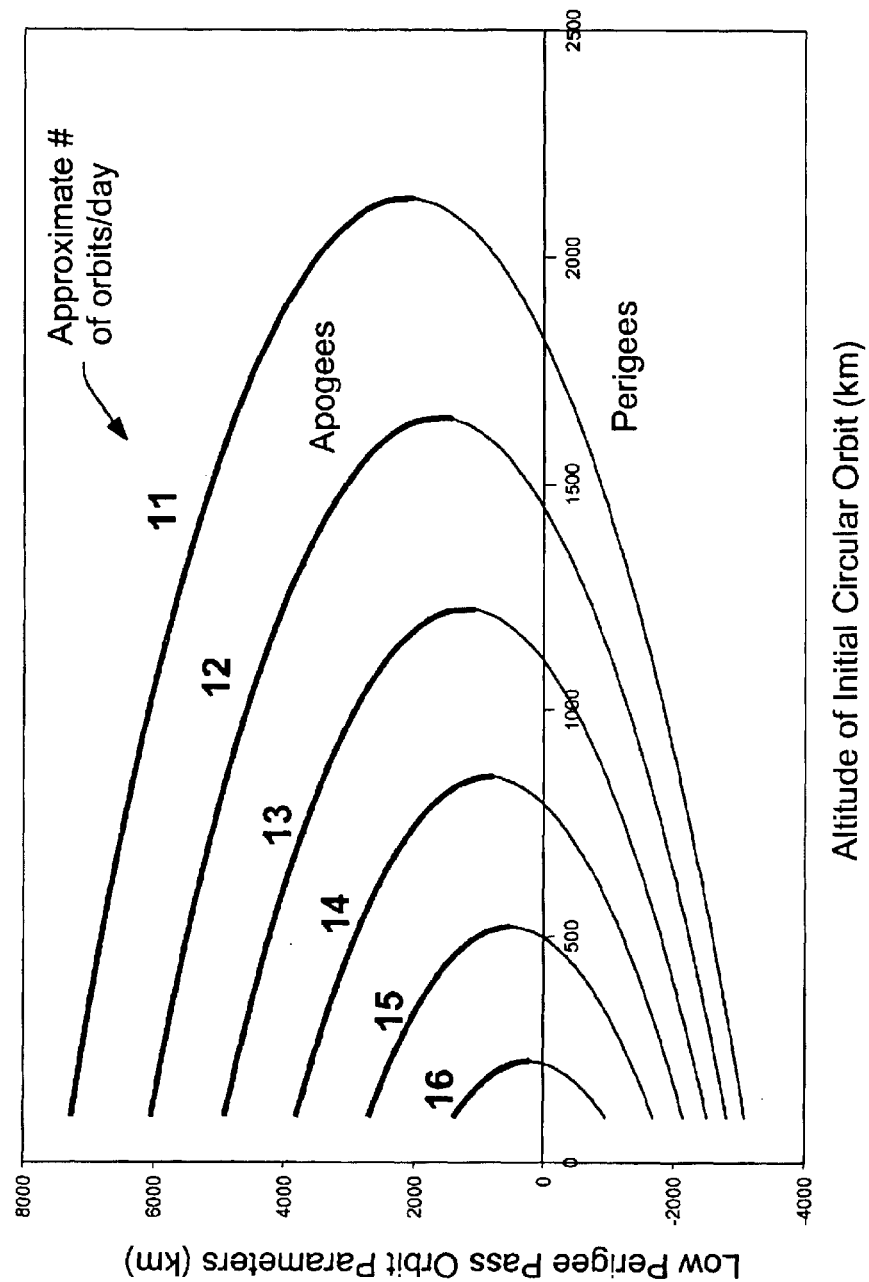
FIG. 9 is a plot of data from an exemplary EXCEL program showing calculated low perigee pass orbit parameters with daily repeat patterns for given initial circular orbits.

An inclination of 63.43° was used, because the line of apses (apogee and perigee) will not shift at this inclination. Using other inclinations does not greatly affect the results; the curves tend to move to the left in the graphs as shown in the program product of FIGS. 6A and 6B. The same curves can also be generated using a spreadsheet program, such as EXCEL, and are shown in FIG. 9.

4. Further Embodiments

The nodally-adjusted repeating ground track elliptical orbit maintains a fixed geometric relationship between both a satellite constellation and the surface of the Earth. Refuelable satellites aid the practicality of implementing such orbital designs. However, one application that may not require on-orbit refueling is in communications. A satellite constellation can be deployed that will provide global baseload communications. It is possible to augment this capability with nodally-adjusted repeating ground track satellites that can provide additional capacity to highly populated regions. Crosslinks between the basic constellation and the additional satellites can facilitate this. The nodally adjusted satellites need not necessarily serve their regions of interest at perigee; in fact, daily apogee passes may be more useful. Furthermore, an alternative configuration could utilize a basic constellation in elliptical orbits, with the additional peak-load satellites in circular orbits having the same nodal regression rate as the basic constellation, as well as a repeating ground track.

In another embodiment, the nodally-adjusted satellites can be used to provide crosslinks between a higher satellite or constellation and a lower one (e.g., perhaps the Space Shuttle or International Space Station) by modeling the lower one as a virtual planetary surface, and devising orbits that maintain a fixed geometric relationship between the two constellations. Also in this case, on-orbit refueling may not be necessary.

The possibility of devising an orbit that maintains a constant geometric relationship between two satellite constellations can also be applicable to a refuelable and or serviceable satellite system itself. For example, a servicing satellite may need to maintain a constant geometric relationship to a client constellation, as well as a commodities or depot spacecraft.

This concludes the description including the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. A satellite system comprising:
    a satellite constellation including a plurality of satellites orbiting a planet to provide a coverage pattern of the planet the plurality of satellites including:
    one or more satellites in circular orbits; and
    at least one satellite of the plurality of satellites in an elliptical orbit having a perigee less than an altitude of the circular orbits and an apogee greater than the altitude of the circular orbits;
    wherein each of the circular orbits and the at least one elliptical orbit are disposed at the same inclination, and each of the plurality of satellites has substantially the same nodal regression rate.

2. The system of claim 1, wherein the elliptical orbit of the at least one satellite includes at least one low perigee pass over a location of interest.

3. The system of claim 1, wherein the plurality of satellites each have an inclination of substantially 63.43°.

4. The system of claim 1, wherein the circular orbits each have an altitude of substantially 1500 km and the elliptical orbit has an elliptical altitude of substantially 237 km×3046 km.

5. The system of claim 1, wherein the satellite constellation provides the coverage pattern for the plurality of satellites to perform observation of the planet.

6. The system of claim 1, wherein the sattelite constellation provides the coverage pattern for the plurality of satellites to provide communication for the planet.

7. The system of claim 1, wherein the plurality of satellites includes a plurality of elliptically orbiting satellites.

8. The system of claim 7, wherein the plurality of elliptically orbiting satellites comprises a row of satellites each having a different right ascension of ascending node and initial mean anomaly.

9. The system of claim 7, wherein the plurality of elliptically orbiting satellite comprises a group of satellites in a plane of a common right ascension of ascending node.

10. The system of claim 9, wherein the plurality of elliptically orbiting satellites further comprises a second group of satellites in a second plane of a second common right ascension of ascending node.

11. The system of claim 1, wherein at least one satellite in the elliptical orbit is a refuelable satellite having fuel replinished at least once to allow the refuelable satellite to be redeployed from one of the circular orbits into the elliptical orbit.

12. The system of claim 11, wherein the elliptical orbit of the refuelable satellite includes a low perigee pass over a location of interest.

13. The system of claim 1, wherein the .plurality of satellites produce repeating ground tracks.

14. The system of claim 13, wherein the repeating ground tracks repeat more than once daily.

15. The system of claim 13, wherein the repeating ground tracks repeat approximately one time per day.

16. A method comprising the steps of:
    maintaining a satellite constellation including a plurality of satellites orbiting a planet to provide a coverage pattern of the planet, including:
    providing one or more satellites in circular orbits; and
    providing at least one satellite of the plurality of satellites in an elliptical orbit having a perigee less than an altitude of the circular orbits and an apogee greater than the altitude of the circular orbits;
    where each of the circular orbits and the at least one elliptical orbit are disposed at the same inclination, and each of the plurality of satellites has substantially the same nodal regression rate.

17. The method of claim 16, wherein the elliptical orbit of the at least one satellite includes at least one low perigee pass over a location of interest.

18. The method of claim 16, wherein the plurality of satellites each have an inclination of substantially 63.43°.

19. The method of claim 16, wherein the circular orbits each have an altitude of substantially 1500 km and the elliptical orbit has an elliptical altitude of substantially 237 km×3046 km.

20. The method of claim 16, wherein the satellite constellation provides the coverage pattern for the plurality of satellites to perform observation of the planet.

21. The method of claim 16, wherein the satellite constellation provides the coverage pattern for the plurality of satellites to provide communication for the planet.

22. The method of claim 16, wherein the plurality of satellites includes a plurality of elliptically orbiting satellites.

23. The method of claim 22, wherein the plurality of elliptically orbiting satellites comprises a row of satellites each having a different right ascension of ascending node and initial mean anomaly.

24. The method of claim 22, wherein the plurality of elliptically orbiting satellites comprises a group of satellites in a plane of a common right ascension of ascending node.

25. The method of claim 24, wherein the plurality of elliptically orbiting satellites further comprises a second group of satellites in a second plane of a second common right ascension of ascending node.

26. The method of claim 16, wherein at least one satellite in the elliptical orbit is a refuelable satellite having fuel replenished at least once to allow the refuelable satellite to be redeployed from one of the circular orbits into the elliptical orbit.

27. The method of claim 26, wherein the elliptical orbit of the refuelable satellite includes a low perigee pass over a location of interest.

28. The method of claim 16, wherein the plurality of satellites produce repeating ground tracks.

29. The method of claim 28, wherein the repeating ground tracks repeat more than once daily.

30. The method of claim 28, wherein the repeating ground tracks repeat approximately one time per day.

31. A method comprising the steps of:
    maintaining a satellite constellation including a plurality of satellites orbiting a planet to provide a coverage pattern of the planet, including:
    deploying one or more satellites in a plurality of circular orbits, each having a nodal regression;
    redeploying at least one satellite in at least one of the plurality of circular orbits into an elliptical orbit;
    adjusting an eccentricity of the elliptical orbit to provide the elliptical orbit the nodal regression,
    wherein each of the circular orbits and the at least one elliptical orbit are disposed at the same inclination, and each of the plurality of satellites has substantially the same nodal regression rate.

32. The method of claim 31, wherein the elliptical orbit of the at least one satellite includes at least one low perigee pass over a location of interest.

33. The method of claim 31, wherein the plurality of satellites each have an inclination of substantially 63.43°.

34. The method of claim 31, wherein the circular orbits each have an altitude of substantially 1500 km and the elliptical orbit has an elliptical altitude of substantially 237 km×3046 km.

35. The method of claim 31, wherein at least one satellite in the elliptical orbit is a refuelable satellite having fuel replenished at least once to allow the refuelable satellite to use the elliptical orbit.

36. The method of claim 35, wherein the elliptical orbit of the refuelable satellite includes a low perigee pass over a location of interest.

* * * * *